US012272310B2

(12) United States Patent
Lee et al.

(10) Patent No.: US 12,272,310 B2
(45) Date of Patent: Apr. 8, 2025

(54) PIXEL CIRCUIT AND DISPLAY DEVICE INCLUDING THE SAME

(71) Applicant: LG Display Co., Ltd., Seoul (KR)

(72) Inventors: Yong Won Lee, Paju-si (KR); Seo Jun Yeom, Paju-si (KR); Byeung Jae Woo, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/491,187

(22) Filed: Oct. 20, 2023

(65) Prior Publication Data

US 2024/0169921 A1 May 23, 2024

(30) Foreign Application Priority Data

Nov. 23, 2022 (KR) ........................ 10-2022-0158074

(51) Int. Cl.
*G09G 5/00* (2006.01)
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2310/0262* (2013.01); *G09G 2310/08* (2013.01); *G09G 2320/0233* (2013.01); *G09G 2320/045* (2013.01); *G09G 2320/064* (2013.01); *G09G 2330/021* (2013.01)

(58) Field of Classification Search
CPC ......... G09G 3/3233; G09G 2300/0819; G09G 2300/0852; G09G 2310/0262; G09G 2310/08; G09G 2320/0233; G09G 2320/045; G09G 2320/064; G09G 2330/021
USPC ........................................................ 345/691
See application file for complete search history.

(56) References Cited

U.S. PATENT DOCUMENTS 10,223,969 B2 3/2019 Park et al.
11,404,003 B2 * 8/2022 Jeong .................. G09G 3/3266
11,580,886 B2 2/2023 Kwon et al.
2017/0092199 A1 3/2017 Park et al.
2021/0327988 A1 * 10/2021 Park .................... H10K 59/131
2022/0028314 A1 1/2022 Kwon et al.
2022/0173189 A1 * 6/2022 Kim ...................... G09G 3/325
2023/0196959 A1 6/2023 Kwon et al.

FOREIGN PATENT DOCUMENTS

KR 10-2017-0039051 A 4/2017
KR 10-2022-0014373 A 2/2022

* cited by examiner

*Primary Examiner* — Jennifer T Nguyen
(74) *Attorney, Agent, or Firm* — Fenwick & West LLP

(57) ABSTRACT

A pixel circuit is disclosed. The pixel circuit includes: a driving element including a first electrode connected to a first node, a gate electrode connected to a second node, and a second electrode connected to a third node; a light emitting element including an anode electrode connected to a fourth node and configured to be driven according to the current from the driving element; a first switch element configured to supply a data voltage to the second node; a second switch element configured to supply an initialization voltage to the first node; a third switch element configured to supply a reference voltage to the third node or the fourth node; a fourth switch element configured to supply a cathode voltage or the reference voltage to the third node or the fourth node; and a fifth switch element configured to supply a pixel driving voltage to the first node.

20 Claims, 12 Drawing Sheets

| | | | | | | |
|---|---|---|---|---|---|---|
| DTG | Vdata +EVSS | Vinit | Vinit | Vdata | Vdata +Vref | Voled +Vdata |
| DTS | EVSS | Vref | Vinit - Vth | Vinit -Vth | Vref | Voled +Vinit-Vth |

| | | | | | | |
|---|---|---|---|---|---|---|
| DTG | Vdata +Vref | Vinit | Vinit | Vdata | Vdata +Vref | Voled +Vdata |
| DTS | Vref | Vref | Vinit - Vth | Vinit -Vth | Vref | Voled +Vinit-Vth |

PIXEL CIRCUIT AND DISPLAY DEVICE INCLUDING THE SAME

CROSS-REFERENCE TO RELATED APPLICATION

This application claims priority to and the benefit of Republic of Korea Patent Application No. 10-2022-0158074, filed in the Republic of Korea on Nov. 23, 2022, which is hereby incorporated by reference in its entirety.

1. TECHNICAL FIELD

The present disclosure relates to a pixel circuit and a display device including the same.

2. DISCUSSION OF RELATED ART

Electroluminescent display devices are generally classified into inorganic light emitting display devices and organic light emitting display devices according to the materials of light emitting layers. Active matrix type organic light emitting display devices include organic light-emitting diodes (hereinafter referred to as "OLEDs"), which emit light by themselves, and have fast response speeds and advantages in which light emission efficiencies, brightness, and viewing angles are high.

In the organic light-emitting display devices, the OLEDs are formed in pixels. Since the organic light-emitting display devices have fast response speeds and are excellent in light emission efficiency, brightness, and viewing angle as well as being able to exhibit a black gradation in a full black color, the organic light-emitting display devices are excellent in a contrast ratio and color reproducibility.

SUMMARY

In an organic light emitting display device, each of pixels includes a pixel circuit. The pixel circuit includes a driving element for driving an OLED and capacitors connected to the driving element. It is newly recognized by inventors of the present disclosure that, due to the capacitors and parasitic capacitance of this pixel circuit, node voltages of the pixel circuit may not be set to a desired initialization voltage before a threshold voltage of the driving element is sensed. In this case, the threshold voltage of the driving element may be sensed incorrectly.

Abnormal luminance is measured in pixels during first and second frame periods when images start to be displayed on a pixel array of a display panel, and the difference in luminance of pixels may increase between the first frame period and the second frame period.

The present disclosure has been made in an effort to address aforementioned necessities and/or drawbacks.

The present disclosure provides a pixel circuit and a display device including the same, which enables to accurately sense a threshold voltage of a driving element disposed in each of pixels, improves the problem of abnormal luminance of the pixels in the first and second frame periods when an input image starts to be displayed, and/or uniformly controls the luminance of the pixels in the first and second frame periods.

Additional features and aspects of the disclosure are set forth in part in the description that follows and in part will become apparent from the description or may be learned by practice of the inventive concepts provided herein. Other features and aspects of the inventive concepts may be realized and attained by the structures pointed out in the present disclosure, or derivable therefrom, and the claims hereof as well as the appended drawings.

The problems or limitations to be solved or addressed by the present disclosure are not limited to those mentioned above, and other problems or limitations not mentioned will be clearly understood by those skilled in the art from the following description.

A pixel circuit according to one embodiment of the present disclosure includes: a driving element including a first electrode connected to a first node, a gate electrode connected to a second node, and a second electrode connected to a third node; a light emitting element including an anode electrode connected to a fourth node and configured to be driven according to the current from the driving element; a first switch element configured to supply a data voltage to the second node; a second switch element configured to supply an initialization voltage to the first node; a third switch element configured to supply a reference voltage to the third node or the fourth node; a fourth switch element configured to supply a cathode voltage or the reference voltage to the third node or the fourth node; and a fifth switch element configured to supply a pixel driving voltage to the first node.

The fourth switch element is configured to be turned on in response to a pulse of a first gate signal in a first step to apply the cathode voltage or the reference voltage to the third node or the fourth node. The second switch element is configured to be turned on in response to a pulse of a second gate signal in second and third steps after the first step to apply the initialization voltage to the second node. The third switch element is configured to be turned on in response to a first pulse of a third gate signal occurring in the second step or in both the second step and the beginning of the third step to apply the reference voltage to the third node or the fourth node. The first switch element is configured to be turned on in response to a pulse of a fourth gate signal in a fourth step after the third step to apply the data voltage to the second node. The fifth switch element is configured to be turned on in response to a pulse of a fifth gate signal in the third step, the fourth step, and a sixth step to apply the pixel driving voltage to the first node.

The pixel circuit further includes: a first capacitor connected between the second node and the third node or between the second node and the fourth node; and a second capacitor connected between a first constant voltage node and the third node or between the first constant voltage node and the fourth node.

The third switch element may apply the reference voltage to the third node or the fourth node in response to a second pulse of the third gate signal in the fifth step.

The pixel circuit further includes a sixth switch element connected between the third node and the fourth node. The sixth switch element may be turned on in response to a pulse of a sixth gate signal in the first step, the second step, the fifth step, and the sixth step to connect the third node to the fourth node.

The switch elements may be turned on when voltages applied to their gate electrodes are a gate-on voltage and turned off when voltages applied to their gate electrodes is a gate-off voltage. The pixel driving voltage may be higher than a maximum voltage of the data voltage. The initialization voltage may set within a voltage range between the maximum voltage and a minimum voltage of the data voltage. The cathode voltage may be lower than the minimum voltage of the data voltage. The reference voltage may be lower than the minimum voltage of the data voltage and higher than the cathode voltage. The gate-on voltage may be higher than the pixel driving voltage. The gate-off voltage may be a voltage lower than the cathode voltage.

The voltage of the first gate signal may be the gate-off voltage in a first step of a first frame period when the input image starts to be displayed, and the voltage of the first gate signal may be the gate-on voltage in every frame period since a second frame period.

In the first step, the voltages of the first and sixth gate signals may be the gate-on voltage, and the voltages of the second to fifth gate signals may be the gate-off voltage. In the second step, the voltages of the second, third, and sixth gate signals may be the gate-on voltage, and the voltages of the first, fourth, and fifth gate signals may be the gate-off voltage. In the third step, the voltages of the second and fifth gate signals may be the gate-on voltage, the voltages of the first, fourth, and sixth gate signals may be the gate-off voltage, and at the beginning of the third step, the voltage of the third gate signal may be generated as the gate-on voltage and then inverted to the gate-off voltage. In the fourth step, the voltages of the fourth and fifth gate signals may be the gate-on voltage, and the voltages of the first, second, third, and sixth gate signals may be the gate-off voltage. In the fifth step, the voltage of the fifth gate signal may be the gate-on voltage, the voltages of the first, second, fourth, and fifth gate signals may be the gate-off voltage, and the voltage of the third gate signal is the voltage is the gate-on voltage or the gate-off voltage. In the sixth step, the voltages of the fifth and sixth gate signals may be the gate-on voltage, and the voltages of the first to fourth gate signals may be the gate-off voltage. In the sixth step, the pulse of the fifth gate signal may be generated as a pulse width modulation (PWM) pulse of the gate-on voltage having a variable duty ratio.

A cathode electrode of the light emitting element may be connected to a second constant voltage node to which the cathode voltage is applied. The first switch element may include a first electrode connected to a data line to which the data voltage is applied, a gate electrode connected to a fourth gate line to which the fourth gate signal is applied, and a second electrode connected to the second node. The second switch element may include a first electrode connected to a third constant voltage node to which the initialization voltage is applied, a gate electrode connected to a second gate line to which the second gate signal is applied, and a second electrode connected to the second node. The third switch element may include a first electrode connected to the third node or the fourth node, a gate electrode connected to a third gate line to which the third gate signal is applied, and a second electrode connected to a fourth constant voltage node to which the reference voltage is applied. The fourth switch element may include a gate electrode connected to a first gate line to which the first gate signal is applied, a first electrode connected to the third node or the fourth node, and a second electrode connected to the second constant voltage node or the fourth constant voltage node. The fifth switch element may include a gate electrode connected to a fifth gate line to which the fifth gate signal is applied, a first electrode connected to a first constant voltage node to which the pixel driving voltage is applied, and a second electrode connected to the first node. The sixth switch element may include a gate electrode connected to a sixth gate line to which the sixth gate signal is applied, a first electrode connected to the third node, and a second electrode connected to the fourth node.

A cathode electrode of the light emitting element may be connected to a second constant voltage node to which the cathode voltage is applied. The first switch element may include a first electrode connected to a data line to which the data voltage is applied, a first gate electrode connected to a fourth gate line to which the fourth gate signal is applied, a second gate electrode connected to the first gate electrode, and a second electrode connected to the second node. The second switch element may include a first electrode connected to a third constant voltage node to which the initialization voltage is applied, a first gate electrode connected to a second gate line to which the second gate signal is applied, a second gate electrode connected to the first gate electrode, and a second electrode connected to the second node. The third switch element may include a first electrode connected to the third node or the fourth node, a first gate electrode connected to a third gate line to which the third gate signal is applied, a second gate electrode connected to the first gate electrode, and a second electrode connected to a fourth constant voltage node to which the reference voltage is applied. The fourth switch element may include a gate electrode connected to a first gate line to which the first gate signal is applied, a first electrode connected to the fourth node, and a second electrode connected to the second constant voltage node or the fourth constant voltage node. The fifth switch element may include a first gate electrode connected to a fifth gate line to which the fifth gate signal is applied, a first electrode connected to a first constant voltage node to which the pixel driving voltage is applied, a second electrode connected to the first node, and a second gate electrode connected to the second node. The sixth switch element may include a gate electrode connected to a sixth gate line to which the sixth gate signal is applied, a first electrode connected to the third node, a second electrode connected to the fourth node, and a second gate electrode connected to the second node.

The switch elements may be turned on when voltages applied to their gate electrodes are a gate-on voltage and turned off when voltages applied to their gate electrodes is a gate-off voltage. The pixel driving voltage may be higher than a maximum voltage of the data voltage. The initialization voltage may set within a voltage range between the maximum voltage and a minimum voltage of the data voltage. The cathode voltage may be lower than the minimum voltage of the data voltage. The reference voltage may be lower than the minimum voltage of the data voltage and higher than the cathode voltage. The gate-on voltage may be higher than the pixel driving voltage. The gate-off voltage may be a voltage lower than the cathode voltage. In the first step, the voltage of the first gate signal may be the gate-on voltage, and the voltages of the second to fifth gate signals may be the gate-off voltage. In the second step, the voltages of the second, third, and fifth gate signals may be the gate-on voltage, and the voltages of the first and fourth gate signals may be the gate-off voltage. In the third step, the voltages of the second and fifth gate signals may be the gate-on voltage, and the voltages of the first, third, and fourth gate signals may be the gate-off voltage. In the fourth step, the voltages of the fourth and fifth gate signals may be the gate-on voltage, and the voltages of the first, second, and third gate signals may be the gate-off voltage. In the fifth step, the voltage of the fifth gate signal may be the gate-on voltage, the voltages of the first, second, and fourth gate signals are the gate-off voltage, and the voltage of the third gate signal may be the gate-on voltage or the gate-off voltage. In the sixth step, the voltage of the fifth gate signal may be the gate-on voltage, and the voltages of the first to fourth gate signals may be the gate-off voltage. A cathode electrode of the light emitting element may be connected to a second constant voltage node to which the cathode voltage is applied. The first switch element may include a first electrode connected to a data line to which the data voltage is applied, a gate electrode connected to a fourth gate line to which the fourth gate signal is applied, and a second electrode connected to the second node. The second switch element may include a first electrode connected to a third constant voltage node to which the initialization voltage is applied, a gate electrode connected to a second gate line to which the second gate signal is applied, and a second electrode connected to the second node. The third switch element may include a first electrode connected to the third node, a gate electrode connected to a third gate line to which the third gate signal is applied, and a second electrode to a fourth constant voltage node which the reference voltage is applied. The fourth switch element may include a gate electrode connected to a first gate line to which the first gate signal is applied, a first electrode connected to the third node, and a second electrode connected to the second constant voltage node or the fourth constant voltage node. The fifth switch element may include a gate electrode connected to a fifth gate line to which the fifth gate signal is applied, a first electrode connected to a first constant voltage node to which the pixel driving voltage is applied, and a second electrode connected to the first node.

The display device of the present disclosure includes the pixel circuit.

The present disclosure may initialize node voltages of the pixel circuit in all pixels to be constant before initializing the pixel circuit, thereby improving the phenomenon that the node voltages in all pixels become uneven due to a previous data voltage. As a result, the present disclosure may accurately sense the threshold voltage of the driving element in each of the pixels, improve the problem of abnormal luminance of the pixels in the first frame period when the input image starts to be displayed and the second period, and control the luminance of the pixels uniformly in the first and second frame periods.

These and other objects of the present disclosure will become more readily apparent from the detailed description given hereinafter. However, it should be understood that the detailed description and specific examples, while indicating preferred embodiments of the present disclosure, are given by way of illustration only, since various changes and modifications within the technical idea and scope of the disclosure will become apparent to those skilled in the art from the below detailed description.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, that may be included to provide a further understanding of the disclosure and may be incorporated in and constitute a part of the disclosure, illustrate embodiments of the disclosure and together with the description serve to explain various principles of the disclosure.

The above and other objects, features, and advantages of the present disclosure will become more apparent to those of ordinary skill in the art by describing exemplary embodiments thereof in detail with reference to the attached drawings, in which.

Figure 1:
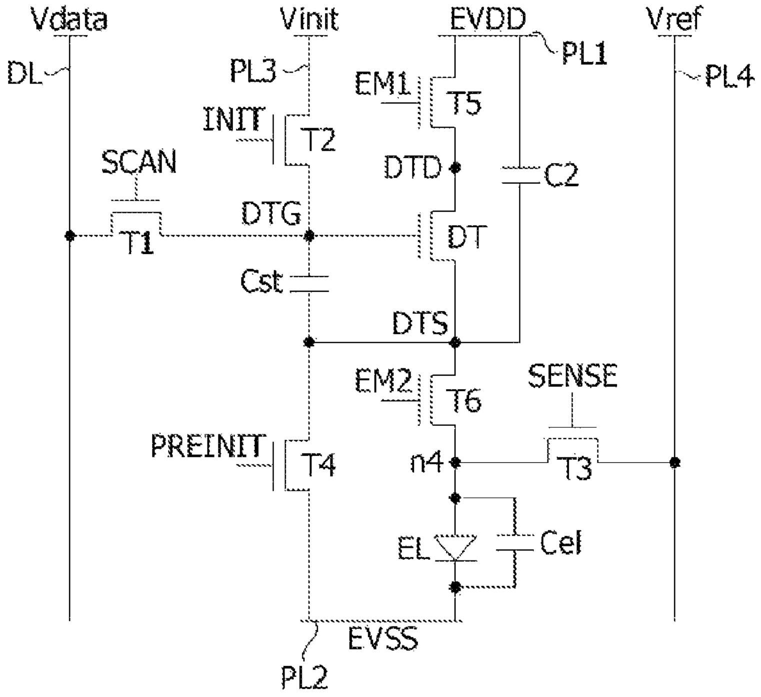
FIG. 1 is an example of a circuit diagram illustrating a pixel circuit according to a first embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

The advantages and features of the present disclosure and methods for accomplishing the same will be more clearly understood from embodiments described below with reference to the accompanying drawings. However, the present disclosure is not limited to the following example embodiments but may be implemented in various different forms. Rather, the example embodiments will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure. Any implementation described herein as an “example” is not necessarily to be construed as preferred or advantageous over other implementations.

The terms such as “comprising,” “including,” “having,” and “comprising” used herein are generally intended to allow other components to be added unless the terms are used with the term “only.” Any references to singular may include plural unless expressly stated otherwise.

Components are interpreted to include an ordinary error range or tolerance range even if there is no explicit description of such an error or tolerance range.

When a positional or interconnected relationship is described between two components, such as “on top of,” “above,” “below,” “next to,” “connect or couple with,” “crossing,” “intersecting,” or the like, one or more other components may be interposed between them, unless “immediately” or “directly” is used.

When a temporal antecedent relationship is described, such as “after”, “following”, “next to”, “before”, or the like, it may not be continuous on a time base unless “immediately” or “directly” is used.

The terms “first,” “second,” and the like may be used to distinguish components from each other, but the functions or structures of the components are not limited by ordinal numbers or component names in front of the components.

The following embodiments can be partially or entirely bonded to or combined with each other and can be linked and operated in technically various ways. The embodiments can be carried out independently of or in association with each other.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein.

For example, the term “part” or “unit” may apply, for example, to a separate circuit or structure, an integrated circuit, a computational block of a circuit device, or any structure configured to perform a described function as should be understood to one of ordinary skill in the art.

Each of the pixels includes a plurality of sub-pixels having different colors for color implementation. Each of the sub-pixels includes a plurality of transistors used as switch elements or driving elements. The transistor may be implemented as a TFT (Thin Film Transistor).

A driving circuit of a display device writes pixel data of an input image to the pixels. A driving circuit of the panel display device includes a data driving circuit for supplying a data signal to data lines, a gate driving circuit for supplying a gate signal to gate lines, and the like.

In the display device of the present disclosure, the pixel circuit and the gate driving circuit may include a plurality of transistors. The transistors may be implemented as an oxide thin film transistor (TFT) including an oxide semiconductor, a low temperature poly silicon TFT (LTPS TFT) including a low temperature poly silicon, and the like. Hereinafter, transistors constituting the pixel circuit and the gate driving circuit will be described focusing on an example implemented with an n-channel oxide TFT, but the present disclosure is not limited thereto, transistors constituting the pixel circuit and the gate driving circuit may be implemented as p-channel oxide TFTs. Here, when the transistor is an n-type transistor, the turn-on level voltage may be a high level voltage, and the turn-off level voltage may be a low level voltage. When the transistor is a p-type transistor, the turn-on level voltage may be a low level voltage and the turn-off level voltage may be a high level voltage.

A transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor (p-channel metal-oxide semiconductor (PMOS)), since carriers are holes, a source voltage is higher than a drain voltage such that holes may flow from a source to a drain. In the p-channel transistor, since holes flow from the source to the drain, current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. A transistor is turned on in response to a gate-on voltage and is turned off in response to a gate-off voltage. In the case of an n-channel transistor, the gate-on voltage may be a gate high voltage, and the gate-off voltage may be a gate low voltage.

Hereinafter, various embodiments of the present disclosure will be described in detail with reference to the accompanying drawings. In the following embodiments, a display device will be described focusing on an organic light emitting display device, but the present disclosure is not limited thereto. Also, the scope of the disclosure is not intended to be limited by the names of components or signals in the following embodiments and claims.

Figure 2:
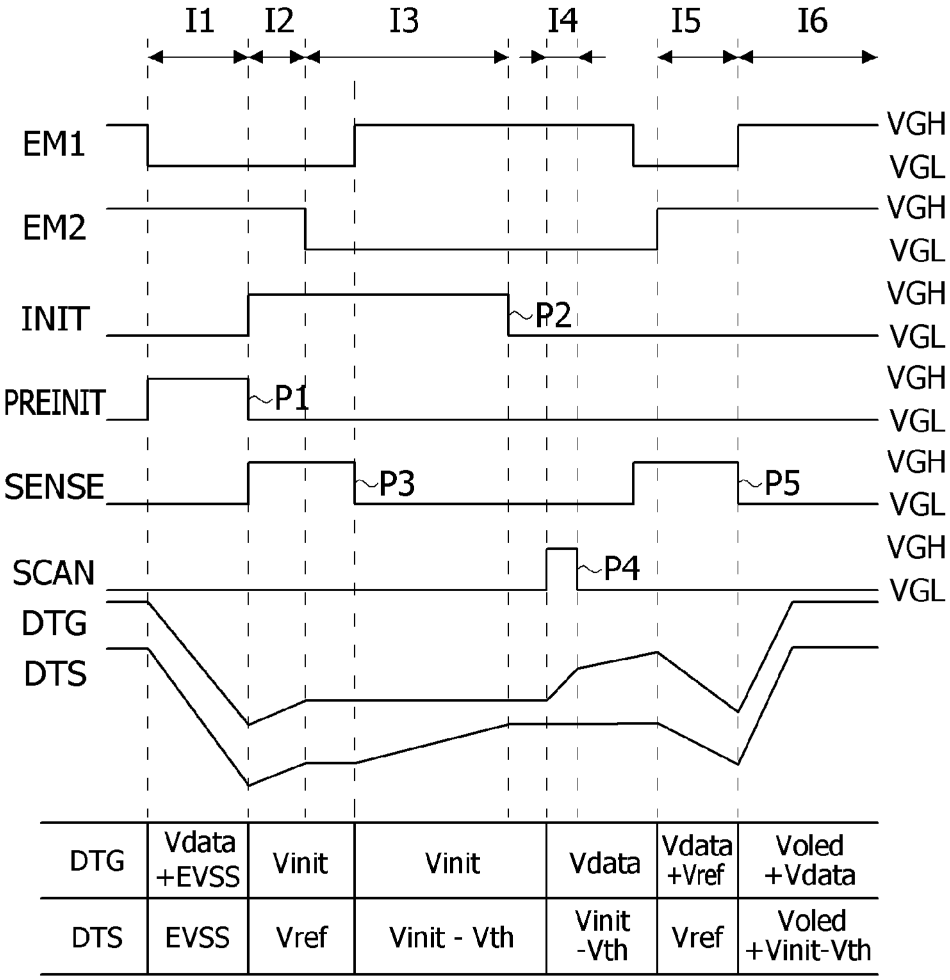
FIG. 2 is an example of a waveform diagram illustrating gate signals applied to the pixel circuit shown in FIG. 1 and voltages at main nodes thereof according to one embodiment.
Figure 3:
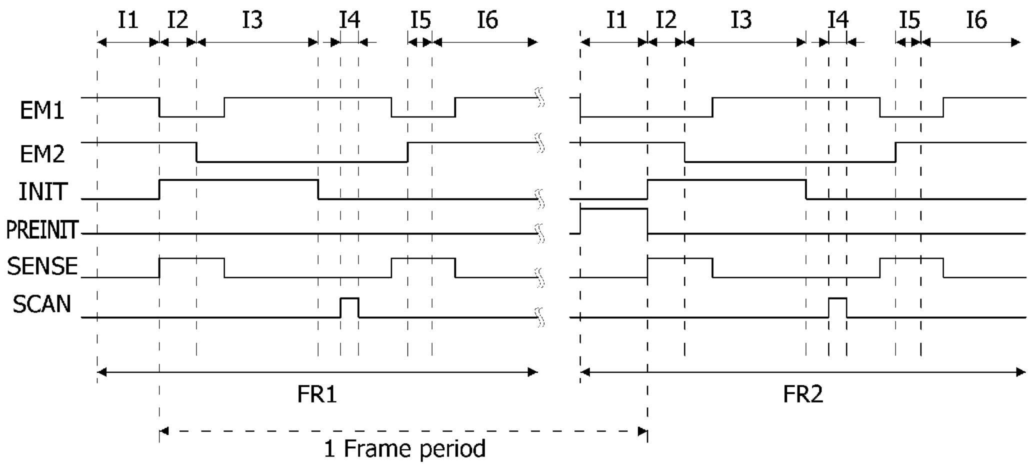
FIG. 3 is an example of a waveform diagram illustrating first and second frame periods when an input image starts to be displayed on a screen of a display panel according to one embodiment.

FIG. 1 is a circuit diagram illustrating a pixel circuit according to a first embodiment of the present disclosure. FIG. 2 is a waveform diagram illustrating gate signals applied to the pixel circuit shown in FIG. 1 and voltages at main nodes thereof according to one embodiment. FIG. 3 is a waveform diagram illustrating first and second frame periods when an input image starts to be displayed on a screen of a display panel according to one embodiment.

Referring to FIGS. 1 and 2, the pixel circuit includes a light emitting element EL, a driving element DT for driving the light emitting element EL, a plurality of switch elements T1 to T6, a first capacitor Cst, and a second capacitor C2. The driving element DT and the switch elements T1 to T6 may be implemented as n-channel oxide TFTs.

The pixel circuit is connected to a data line DL to which a data voltage Vdata is applied and gate lines to which gate signals SCAN, INIT, SENSE, and SCAN are applied. The pixel circuit is connected to power nodes to which direct current (DC) voltages (or constant voltages) are applied, such as a first constant voltage node PL1 to which a pixel driving voltage EVDD is applied, a second constant voltage node PL2 to which a cathode voltage EVSS is applied, a third constant voltage node PL3 to which an initialization voltage Vinit is applied, and a fourth constant voltage node PL4 to which a reference voltage Vref is applied. On the display panel, the power lines to which the constant voltage nodes are connected may be commonly connected to all of pixels.

The pixel driving voltage EVDD is set to a voltage greater than a maximum voltage of the data voltage Vdata and at which the driving element DT can operate in a saturation region. The initialization voltage Vinit may be set to a voltage at which the driving element DT can be turned on within a voltage range between the maximum and minimum voltage of the data voltage Vdata. The pixel reference voltage EVSS is set to a voltage lower than the minimum voltage of the data voltage Vdata. The reference voltage Vref may be set to a voltage lower than the minimum voltage of the data voltage Vdata and higher than the cathode voltage EVSS. A gate-on voltage VGL may be set to a voltage higher than the pixel driving voltage EVDD, and a gate-off voltages VGH may be set to a voltage lower than the cathode voltage EVSS. For example, but not limited to, EVDD=12V, EVSS=−6V, VGH=20V, VGL=−14V, Vinit=1V, and Vref=−4V.

The gate signals PREINIT, INIT, SENSE, SCAN, EM1, and EM2 are generated as pulses that swing between the gate-on voltage VGH and the gate-off voltage VGL.

The light emitting element EL may be implemented as an OLED. The light emitting element EL includes an organic compound layer formed between an anode electrode connected to a fourth node n4 and a cathode electrode to which the cathode voltage EVSS is applied. When a sixth switch element T6 is turned on, the anode electrode of the light emitting element EL is connected to a third node DTS via the sixth switch element T6. The organic compound layer may include, but is not limited to, a hole injection layer (HIL), a hole transport layer (HTL), a light emission layer (EML), an electron transport layer (ETL), and an electron injection layer (EIL). When a voltage is applied to the anode and cathode electrodes of the light emitting element EL, holes passing through the hole transport layer (HTL) and electrons passing through the electron transport layer (ETL) move to the emission layer (EML) to form excitons. In this case, visible light is emitted from the emission layer (EML). The light emitting element EL may include a capacitor Cel connected between the anode electrode and the cathode electrode. For example, the capacitor Cel may be a parasitic capacitor of the light emitting element EL. The light emitting element EL may have a tandem structure with a plurality of light emitting layers stacked on top of each other. The light emitting element EL having the tandem structure may improve the luminance and lifespan of pixels.

The driving element DT generates a current according to the gate-source voltage Vgs to drive the light emitting element EL. The driving element DT includes a first electrode connected to a first node DTD, a gate electrode connected to a second node DTG, and a second electrode connected to the third node DTS. The first node DTD may be connected to the first constant voltage node PL1 to which the pixel driving voltage EVDD is applied.

The first capacitor Cst is connected between the second node DTG and the third node DTS to store the gate-source voltage of the driving element DT. The second capacitor C2 is connected between the first constant voltage node PL1 and the third node DTS to increase the transfer efficiency of the data voltage Vdata being charged in the first capacitor Cst. The first and second capacitors Cst and C2 may be set to the same capacitance or different capacitances.

The switch elements T1 to T6 of the pixel circuit include a first switch element T1 that supplies the data voltage Vdata of pixel data to the second node DTG in response to a fourth gate signal SCAN, a second switch element T2 that supplies the initialization voltage Vinit to the second node DTG in response to a second gate signal INIT, a third switch element T3 that supplies the reference voltage Vref to the third node DTS in response to a third gate signal SENSE, a fourth switch element T4 that connects the third node DTS to the second constant voltage node PL2, in response to a first gate signal PREINIT, to which the cathode voltage EVSS is applied, a fifth switch element T5 that connects the first constant voltage node PL1 to the first node DTD in response to a fifth gate signal EM1, and a sixth switch element T6 that connects the third node DTS to the anode electrode of the light emitting element EL in response to a sixth gate signal EM2.

The first switch element T1 is turned on in response to a scan pulse P4 of the fourth gate signal SCAN synchronized to the data voltage Vdata of the pixel data in a fourth step I4. The scan pulse P4 is generated as the gate-on voltage VGH.

When the first switch element T1 is turned on, the data line DL is connected to the second node DTG (i.e., the gate electrode of the driving element DT). Therefore, a data voltage Vdata is applied to the second node DTG in the fourth step I4. The first switch element T1 includes a first electrode connected to the data line DL to which the data voltage Vdata is applied, a gate electrode connected to a fourth gate line to which the fourth gate signal SCAN is applied, and a second electrode connected to the second node DTG.

The second switch element T2 is turned on in response to a pulse P2 of the second gate signal INIT, which is generated as the gate-on voltage VGH, in a second step I2 and a third step I3. When the second switch element T2 is turned on, the initialization voltage Vinit is applied to the second node DTG. The second switch element T2 includes a first electrode connected to the third constant voltage node PL3 to which the initialization voltage Vinit is applied, a gate electrode connected to a second gate line to which the second gate signal INIT is applied, and a second electrode connected to the second node DTG.

The third switch element T3 is turned on in response to a first pulse P3 of the third gate signal SENSE, which is generated as the gate-on voltage VGH, in the second step I2. The third switch element T3 may be turned on in response to the first pulse P3 of the third gate signal SENSE at the beginning of the third step I3. Further, the third switch element T3 is turned on in the fifth step I5 in response to a second pulse P5 of the third gate signal SENSE, which is generated as a gate-on voltage VGH, in the low-speed driving mode. When the third switch element T3 is turned on, the reference voltage Vref is supplied to the fourth node n4 (i.e., the anode of EL). The third switch element T3 includes a first electrode connected to the fourth node n4, a gate electrode connected to a third gate line to which the third gate signal SENSE is applied, and a second electrode connected to the fourth constant voltage node PL4 to which the reference voltage Vref is applied.

The fourth switch element T4 is turned on in response to a pulse P1 of the first gate signal PREINIT, which is generated as the gate-on voltage VGH, in a first step I1. When the fourth switch element T4 is turned on, the third node DTS is connected to the second constant voltage node PL2 to which the cathode voltage EVSS is applied. The fourth switch element T4 includes a gate electrode connected to a first gate line to which the first gate signal PREINIT is applied, a first electrode connected to the third node DTS, and a second electrode connected to the second constant voltage node PL2.

The fifth switch element T5 is turned on in response to a pulse of the fifth gate signal EM1, which is generated as the gate-on voltage VGH, in the third, fourth, and sixth steps I3, I4, and I6. When the fifth switch element T5 is turned on, the first constant voltage node PL1 is connected to the first node DTD so as to apply the pixel driving voltage EVDD. The fifth switch element T5 includes a gate electrode connected to a fifth gate line to which the fifth gate signal EM1 is applied, a first electrode connected to the first constant voltage node PL1, and a second electrode connected to the first node DTD.

The sixth switch element T6 is turned on in response to a pulse of the sixth gate signal EM2, which is generated as the gate-on voltage VGH, in the first, second, fifth, and sixth steps I1, I2, I5, and I6. When the sixth switch element T6 is turned on, the third node DTS is connected to the anode electrode of the light emitting element EL. The sixth switch element T6 includes a gate electrode connected to a sixth gate line to which the sixth gate signal EM2 is applied, a first electrode connected to the third node DTS, and a second electrode connected to the fourth node n4.

A driving period of the pixel circuit may be divided into the first to sixth steps I1 to I6 defined by the gate signals PREINIT, INIT, SENSE, SCAN, EM1, and EM2 as shown in FIG. 2.

In the first and second steps I1 and I2, the pixel circuit is initialized. In the first step I1, the pulse P1 of a first gate signal PREINIT may be generated as the gate-on voltage VGH. In the first step I1, the voltages of the second to fifth gate signals INIT, SENSE, SCAN, and EM1 are the gate-off voltage VGL. In the first step I1, the voltage of the sixth gate signal EM2 may be the gate-on voltage VGH for discharging the anode electrode of the light emitting element EL.

The pulse P1 of the first gate signal PREINIT discharges the voltage of the second and third nodes DTG and DTS of the pixel circuit. This pulse P1 may allow the voltages of the second and third nodes DTG and DTS, resulting from due to the data voltage Vdata that has been applied in a previous frame period, to be uniform in each of the pixels. In the first step I1, the voltage of the second node DTG is reduced to Vdata+EVSS. In the first step I1, the voltage of the third node DTS is reduced to EVSS. In the first step I1, the data voltage Vdata, which influences the voltage of the second node DTG, is the data voltage of the previous frame which was stored in the first capacitor Cst.

As shown in FIG. 3, in the case of a first frame period FR1 in which an input image starts to be displayed on a screen of the display panel, since there is no influence of the previous data voltage Vdata on the pixel circuit, the pulse P1 may not be generated and the voltage of the first gate signal PREINIT may be the gate-off voltage VGL in the first step I1. The pulse P1 may be generated at each frame period after the second frame period FR2.

In the second step I2, the pulse P2 of the second gate signal INIT and the first pulse P3 of the third gate signal SENSE may be generated as the gate-on voltage VGH. In the second step I2, the voltage of the first gate signal PREINT is inverted to the gate-off voltage VGL. In the second step I2, the voltages of the fourth and fifth gate signals SCAN and EM1 are the gate-off voltage VGL, and the voltage of the sixth gate signal EM2 is the gate-on voltage VGH. In the second step I2, the voltages of the second and third nodes DTG and DTS are uniformly initialized in all pixels, and the driving element DT is turned on. In the second step I2, the voltage of the second node DTG is changed from Vdata+EVSS to Vinit, and the voltage of the third node DTS is changed from EVSS to Vref.

In the third step I3, the pulse of the fifth gate signal EM1 may keep at the gate-off voltage VGL, and then inverted to the gate-on voltage VGH, and the voltage of the second gate signal INIT is the gate-on voltage VGH. The voltage of the third gate signal SENSE is generated as the gate-on voltage VGH at the beginning of the third step I3 and then inverted to the gate-off voltage VGL. In the third step I3, the voltages of the first, fourth, and sixth gate signals PREINIT, SCAN, and EM2 are the gate-off voltage VGL.

The voltage of the sixth gate signal EM2 is inverted to the gate-off voltage VGL at the start of the third step I3, and after a predetermined time, the third gate signal SENSE may keep at the gate-on voltage VGL at the beginning of the third step I3, and then inverted to is inverted to the gate-off voltage VGL. At the same time that the third gate signal SENSE is inverted to the gate-off voltage VGL, the voltage of the fifth gate signal EM1 may be inverted to the gate-on voltage VGH.

In the third step I3, when the voltage of the third node DTS increases so that the gate-source voltage Vgs of the driving element DT is less than a threshold voltage Vth of the driving element DT, the driving element DT is turned off and at this time, a threshold voltage Vth is charged in the capacitor Cst. Therefore, in the third step I3, the threshold voltage Vth of the driving element DT is sensed. In the third step I3, the voltage of the second node DTG is Vinit, and the voltage of the third node DTS is Vinit−Vth.

In the fourth step I4, the voltage of the fifth gate signal EM1 is the gate-on voltage VGH, and the scan pulse P4 of the fourth gate signal SCAN is generated as the gate-on voltage VGH. In the fourth step I4, the data voltage Vdata of the pixel data synchronized to the scan pulse P4 is supplied to the data line DL. In the fourth step I4, the voltages of the first, second, third, and sixth gate signals PREINIT, INIT, SENSE, and EM2 are the gate-off voltage VGL. In step 4 I4, the voltage of the second node DTG is changed to the data voltage Vdata of a current frame, and the voltage of the third node DTS is Vinit−Vth.

In the fourth step I4, the voltage of the third node DTS is changed according to the mobility 'p' of the driving element DT, so that the variation or deviation of the mobility of the driving element DT in each of the pixels may be compensated. For example, for pixels with a large mobility of the driving element DT within a predetermined time of the fourth step I4, the voltage of the third node DTS is increased to reduce the gate-source voltage Vgs of the driving element DT. On the other hand, for pixels with a relatively small mobility of the driving element DT, the voltage of the third node DTS is decreased to increase the gate-source voltage Vgs of the driving element DT.

The voltage of the third gate signal SENSE is inverted to the gate-on voltage VGH between the fourth step I4 and the fifth step I5 and at the same time, the voltage of the fifth gate signal EM1 is inverted to the gate-off voltage VGL, and then the sixth gate signal EM2 may be inverted to the gate-on voltage VGH at the start of the fifth step I5.

A frame frequency of the input image inputted to the display device may be varied in a wide frequency range, such as 30 Hz, 60 Hz, and 120 Hz. For example, a host system or a timing controller in a display device may vary the frame frequency to match the movement or content characteristics of the input image. When the frame frequency is lowered, one frame period during which the pixel data is written and a time period during which the data voltage Vdata is charged into the pixels increase, causing the voltage of the third node DTS to change. In this case, the gate-source voltage Vgs of the driving element DT in the pixels changes, which changes the amount of current supplied to the light emitting element EL. Therefore, changing the refresh rate may change the pixel luminance.

The second pulse P5 of the third gate signal SENSE may be generated in the fifth step I5 when the frame frequency of the input image is lowered to the frequency in the low-speed driving mode condition. The frequency of this pulse P5 may be controlled to be constant without changing even if the frequency changes in the low-speed driving mode. Voltage changes in the third node DTS when the frame frequency of the input image is lowered may be reduced or prevented by the pulse P5 generated at a constant frequency.

In the fifth step I5, the second pulse P5 of the third gate signal SENSE is generated as the gate-on voltage VGH, and the voltage of the sixth gate signal EM2 is the gate-on voltage VGH. In the fifth step I5, the voltages of the first, second, fourth, and fifth gate signals PREINIT, INIT, SCAN, and EM1 are the gate-off voltage VGL. The second pulse P5 of the third gate signal SENSE may be generated in a low-speed driving mode in which the frame frequency is lowered. The second pulse P5 does not occur in a normal driving mode with a high frame frequency, and the voltage of the third gate signal SENSE may be the gate-off voltage VGL in the fifth step I5. In step I5, the voltage of the second node DTG is reduced to Vdata+Vref, and the voltage of the third node DTS is reduced to Vref.

In step 6 I6, the voltages of the fifth and sixth gate signals EM1 and EM2 are the gate-on voltage VGH. In step 6 I6, the voltages of the first to fourth gate signals PREINIT, INIT, SCAN, and SENSE are the gate-off voltage VGL. In the sixth step I6, the light emitting element EL may be driven by a current from the driving element DT to emit light with a brightness corresponding to the gray scale value of the pixel data. In the sixth step I6, the voltage of the second node DTG is boosted to Voled+Vdata, and the voltage of the third node DTS is boosted to Voled+Vinit−Vth. Here, "Voled" is the voltage charged in the capacitor Cel of the light emitting element EL in the sixth step I6.

In the sixth step I6, the fifth gate signal EM1 may be generated as a pulse width modulation (PWM) pulse. The PWM pulse may vary its duty ratio according to a digital brightness value (hereinafter referred to as DBV). The PWM pulse of the fifth gate signal EM1 may minimize or reduce an afterimage occurring in the expression of low gray scales and improve the luminance uniformity of the low gray scales by adjusting the light-on and light-off ratio, for example, the light emission duty, of the light emitting element EL, thereby enhancing the low gray scale expression ability of the pixels and reducing the leakage current of the pixels. In the sixth step I6, the third gate signal SENSE together with the fifth gate signal EM1 may also be generated as the PWM pulse. In this case, the third and fifth gate signals SENSE and EM1 may be synchronized with each other in the sixth step I6 such that when the third gate signal SENSE rises to the gate-on voltage VGH, the fifth gate signal EM1 falls to the gate-off voltage VGL, and vice versa.

Figure 4:
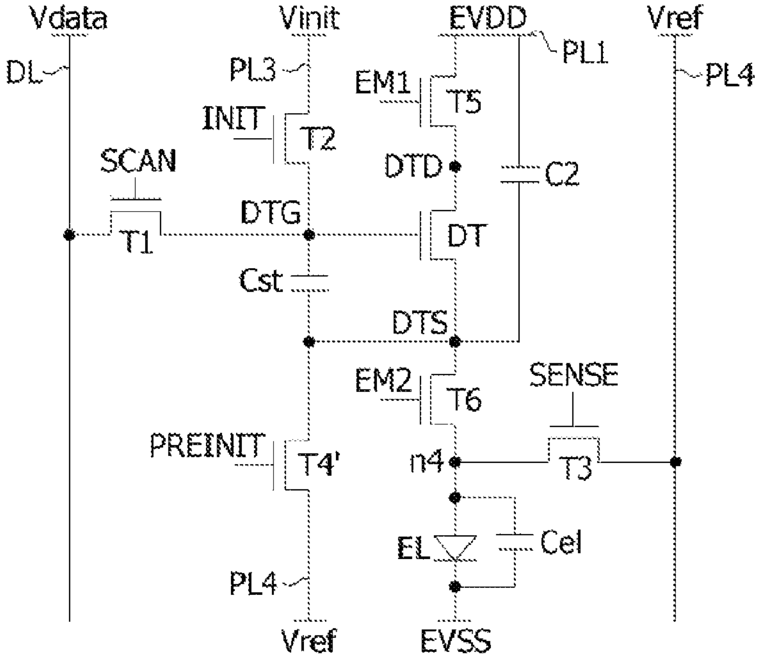
FIG. 4 is an example of a circuit diagram illustrating a pixel circuit according to a second embodiment of the present disclosure.
Figure 5:
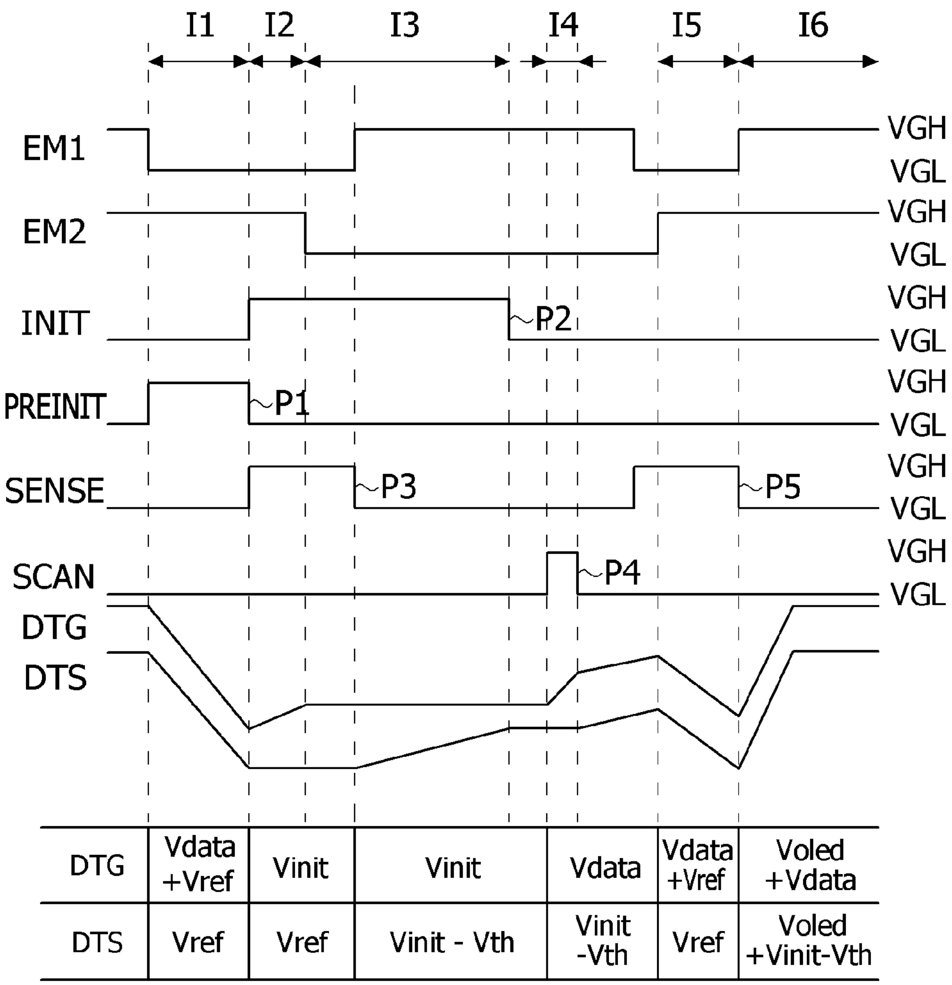
FIG. 5 is an example of a waveform diagram illustrating gate signals applied to the pixel circuit shown in FIG. 4 and voltages at main nodes thereof according to one embodiment.

FIG. 4 is a circuit diagram illustrating a pixel circuit according to a second embodiment of the present disclosure. FIG. 5 is a waveform diagram illustrating gate signals applied to the pixel circuit shown in FIG. 4 and voltages at main nodes thereof according to one embodiment. In FIGS. 4 and 5, the components that are substantially the same as those of the first embodiment described above are designated with the same reference numerals and a detailed description thereof will be omitted or may be briefly provided.

Referring to FIGS. 4 and 5, the pixel circuit includes a light emitting element EL, a driving element DT for driving the light emitting element EL, a plurality of switch elements T1 to T6, a first capacitor Cst, and a second capacitor C2. The driving element DT and the switch elements T1 to T6 may be implemented as n-channel oxide TFTs.

A fourth switch element T4' is turned on in response to a pulse P1 of the first gate signal PREINIT, which is generated as the gate-on voltage VGH, in a first step I1. When the fourth switch element T4' is turned on, the third node DTS is connected to the fourth constant voltage node PL4 to which the reference voltage Vref is applied. The fourth switch element T4' includes a gate electrode connected to a first gate line to which the first gate signal PREINIT is applied, a first electrode connected to the third node DTS, and a second electrode connected to the fourth constant voltage node PL4.

In the first and second steps I1 and I2, the pixel circuit is initialized. In the first step I1, the pulse P1 of a first gate signal PREINIT may be generated as the gate-on voltage VGH. In the first step I1, the voltages of the second to fifth gate signals INIT, SENSE, SCAN, and EM1 are the gate-off voltage VGL. In the first step I1, the voltage of the sixth gate signal EM2 may be the gate-on voltage VGH for discharging the anode electrode of the light emitting element EL. In the first step I1, the voltage of the second node DTG is decreased to Vdata+Vref. In the first step I1, the voltage of the third node DTS is decreased to Vref. In the first step I1, the data voltage Vdata, which influences the voltage of the second node DTG, is the data voltage of a previous frame.

As shown in FIG. 3, in the case of a first frame period FR1 in which an input image starts to be displayed on a screen of the display panel, since there is no influence of the previous data voltage Vdata on the pixel circuit, the pulse P1 may not be generated and the voltage of the first gate signal PREINIT may be the gate-off voltage VGL in the first step I1. The pulse P1 may be generated at each frame period after the second frame period FR2.

In the second step I2, the pulse P2 of the second gate signal INIT and the first pulse P3 of the third gate signal SENSE may be generated as the gate-on voltage VGH. In the second step I2, the voltage of the first gate signal PREINT is inverted to the gate-off voltage VGL. In the second step I2, the voltages of the fourth and fifth gate signals SCAN and EM1 are the gate-off voltage VGL, and the voltage of the sixth gate signal EM2 is the gate-on voltage VGH.

In the second step I2, the voltages of the second and third nodes DTG and DTS are uniformly initialized in all pixels, and the driving element DT is turned on. In the second step I2, the voltage of the second node DTG changes from Vdata+Vref to Vinit, and the voltage of the third node DTS is Vref.

In the third step I3, the pulse of the fifth gate signal EM1 is generated as the gate-on voltage VGH, and the voltage of the second gate signal INIT is the gate-on voltage VGH. The voltage of the third gate signal SENSE is generated as the gate-on voltage VGH at the beginning of the third step I3 and then inverted to the gate-off voltage VGL. In the third step I3, the voltages of the first, fourth, and sixth gate signals PREINIT, SCAN, and EM2 are the gate-off voltage VGL. In the third step I3, the voltage of the second node DTG is Vinit, and the voltage of the third node DTS is Vinit−Vth.

In the fourth step I4, the voltage of the fifth gate signal EM1 is the gate-on voltage VGH, and the scan pulse P4 of the fourth gate signal SCAN is generated as the gate-on voltage VGH. In the fourth step I4, the data voltage Vdata of the pixel data synchronized to the scan pulse P4 is supplied to the data line DL. In the fourth step I4, the voltages of the first, second, third, and sixth gate signals PREINIT, INIT, SENSE, and EM2 are the gate-off voltage VGL. In step 4 I4, the voltage of the second node DTG is changed to the data voltage Vdata of a current frame, and the voltage of the third node DTS is Vinit−Vth. In the fourth step I4, the voltage of the third node DTS is changed according to the mobility of the driving element DT, so that the variation or deviation of the mobility of the driving element DT in each of the pixels may be compensated.

The second pulse P5 of the third gate signal SENSE may be generated in the fifth step I5 when the frame frequency of the input image is lowered to the frequency in the low-speed driving mode condition. The frequency of this pulse P5 may be controlled to be constant without changing even if the frequency changes in the low-speed driving mode. Voltage changes in the third node DTS when the frame frequency of the input image is lowered may be reduced or prevented by the pulse P5 generated at a constant frequency.

In the fifth step I5, the second pulse P5 of the third gate signal SENSE is generated as the gate-on voltage VGH, and the voltage of the sixth gate signal EM2 is the gate-on voltage VGH. In the fifth step I5, the voltages of the first, second, fourth, and fifth gate signals PREINIT, INIT, SCAN, and EM1 are the gate-off voltage VGL. The second pulse P5 of the third gate signal SENSE may be generated in a low-speed driving mode in which the frame frequency is lowered. The second pulse P5 does not occur in a normal driving mode with a high frame frequency, and the voltage of the third gate signal SENSE may be the gate-off voltage VGL in the fifth step I5. In step I5, the voltage of the second node DTG is reduced to Vdata+Vref, and the voltage of the third node DTS is reduced to Vref.

In step 6 I6, the voltages of the fifth and sixth gate signals EM1 and EM2 are the gate-on voltage VGH. In step 6 I6, the voltages of the first to fourth gate signals PREINIT, INIT, SCAN, and SENSE are the gate-off voltage VGL. In the sixth step I6, the light emitting element EL may be driven by a current from the driving element DT to emit light with a brightness corresponding to the gray scale value of the pixel data. In the sixth step I6, the voltage of the second node DTG is boosted to Voled+Vdata, and the voltage of the third node DTS is boosted to Voled+Vinit−Vth. Here, "Voled" is the voltage charged in the capacitor Cel of the light emitting element EL in the sixth step I6.

In the sixth step I6, the fifth gate signal EM1 may be generated as the PWM pulse. The PWM pulse may vary its duty ratio according to the DBV. The PWM pulse of the fifth gate signal EM1 may minimize or reduce an afterimage occurring in the expression of low gray scales and improve the luminance uniformity of the low gray scales by adjusting the light-on and light-off ratio, for example, the light emission duty, of the light emitting element EL, thereby enhancing the low gray scale expression ability of the pixels and reducing the leakage current of the pixels. In the sixth step I6, the third gate signal SENSE together with the fifth gate signal EM1 may also be generated as the PWM pulse. In this case, the third and fifth gate signals SENSE and EM1 may be synchronized with each other in the sixth step I6 such that when the third gate signal SENSE rises to the gate-on voltage VGH, the fifth gate signal EM1 falls to the gate-off voltage VGL, and vice versa.

Figure 6:
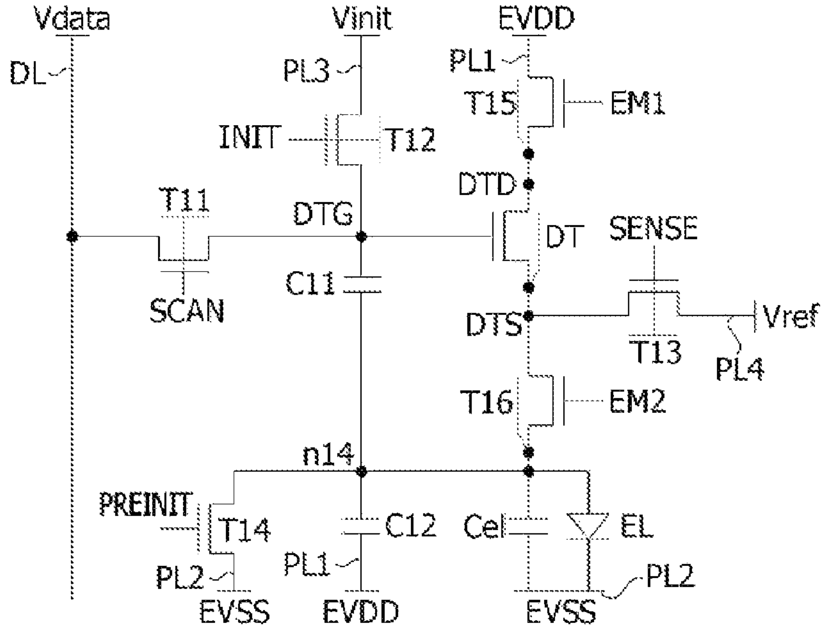
FIG. 6 is an example of a circuit diagram illustrating a pixel circuit according to a third embodiment of the present disclosure.
Figure 7:
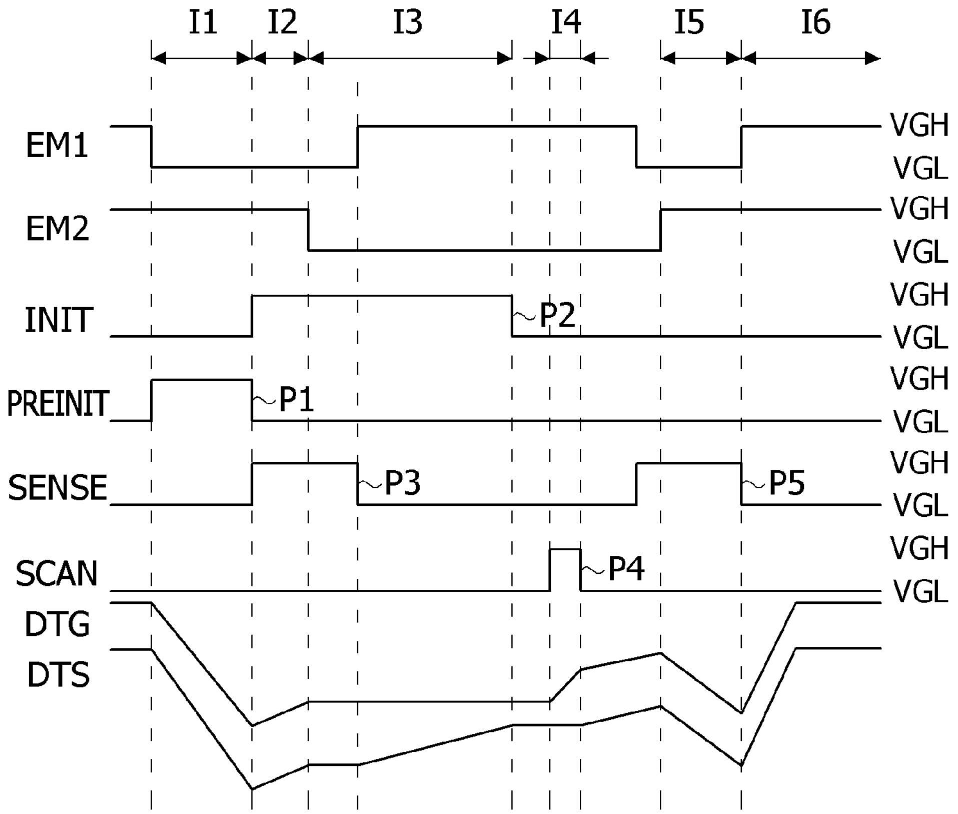
FIG. 7 is an example of a waveform diagram illustrating gate signals applied to the pixel circuit shown in FIG. 6 and voltages at main nodes thereof according to one embodiment.

FIG. 6 is a circuit diagram illustrating a pixel circuit according to a third embodiment of the present disclosure. FIG. 7 is a waveform diagram illustrating gate signals applied to the pixel circuit shown in FIG. 6 and voltages at main nodes thereof according to one embodiment.

Referring to FIGS. 6 and 7, the pixel circuit includes an emitting element EL, a driving element DT that drives the emitting element EL, a plurality of switch elements T11 to T16, a first capacitor C11, and a second capacitor C12. The driving element DT and the switch elements T11 to T16 may be implemented as n-channel oxide TFTs. The driving element DT and some of the switch elements T11 to T13, T15, and T16 may be a four-terminal transistor. The four-terminal transistor may further include a second gate electrode (or bottom gate electrode) that applies a back gate bias using a light shield pattern disposed below the transistor. A back gate bias voltage may shift a threshold voltage of a switch element to a desired voltage, thereby improving the reliability of the pixel circuit.

The pixel circuit is connected to a data line DL to which a data voltage Vdata is applied and gate lines to which gate signals SCAN, INIT, SENSE, and SCAN are applied. The pixel circuit is connected to power nodes to which DC voltages (or constant voltages) are applied, such as a first constant voltage node PL1 to which a pixel driving voltage EVDD is applied, a second constant voltage node PL2 to which a cathode voltage EVSS is applied, a third constant voltage node PL3 to which an initialization voltage Vinit is applied, and a fourth constant voltage node PL4 to which a reference voltage Vref is applied. On the display panel, the power lines to which the constant voltage nodes are connected may be commonly connected to all of pixels. The voltage applied to the pixel circuit may be set to, but not limited to, the same as in the first embodiment described above.

The gate signals PREINIT, INIT, SENSE, SCAN, EM1, and EM2 include a first gate signal PREINIT, a second gate signal INIT, a third gate signal SENSE, a fourth gate signal SCAN, a fifth gate signal EM1, and a sixth gate signal EM2.

The light emitting element EL may be implemented as an OLED. The OLED includes an organic compound layer formed between an anode electrode and a cathode electrode.

The organic compound layer may include, but is not limited to, a hole injection layer HIL, a hole transport layer HTL, an emission layer EML, an electron transport layer ETL, and an electron injection layer EIL. An anode electrode of the light emitting element EL is connected to a fourth node n14, and when a sixth switch element T16 is turned on, it is connected to a third node DTS via the sixth switch element T16. The cathode voltage EVSS is applied to a cathode electrode of the light emitting element EL. The light emitting element EL includes a capacitor Cel connected between the anode electrode and the cathode electrode. The OLED used as the light emitting element EL may be of a tandem structure in which a plurality of light-emitting layers are stacked on top of each other. The OLED having the tandem structure may improve the luminance and lifespan of pixels.

The driving element DT generates a current according to the gate-source voltage Vgs to drive the light emitting element EL. The driving element DT includes a first electrode connected to a first node DTD, a first gate electrode connected to a second node DTG, a second electrode connected to the third node DTS, and a second gate electrode connected to the third node DTS. The first node DTD may be connected to the first constant voltage node PL1 to which the pixel driving voltage EVDD is applied.

The first capacitor C11 is connected between the second node DTG and the fourth node n14 to store the gate-source voltage of the driving element DT. The second capacitor C12 is connected between the first constant voltage node PL1 and the fourth node n14 to increase the transfer efficiency of the data voltage Vdata being charged in the first capacitor C11. The first and second capacitors C11 and C12 may be set to the same capacitance or different capacitances.

The switch elements T11 to T16 of the pixel circuit include a first switch element T11 that supplies the data voltage Vdata of pixel data to the second node DTG in response to the fourth gate signal SCAN, a second switch element T12 that supplies the initialization voltage Vinit to the second node DTG in response to the second gate signal INIT, a third switch element T13 that supplies the reference voltage Vref to the third node DTS in response to the third gate signal SENSE, a fourth switch element T14 that connects the fourth node n14 to the second constant voltage node PL2, in response to the first gate signal PREINIT, to which the cathode voltage EVSS is applied, a fifth switch element T15 that connects the first constant voltage node PL1 to the first node DTD in response to the fifth gate signal EM1, and a sixth switch element T16 that connects the third node DTS to the fourth node n14 in response to the sixth gate signal EM2.

The first switch element T11 is turned on in response to the scan pulse P4 of the fourth gate signal SCAN synchronized to the data voltage Vdata of the pixel data in a fourth step I4. The scan pulse P4 is generated as the gate-on voltage VGH. When the first switch element T11 is turned on, the data line DL is connected to the second node DTG. Therefore, a data voltage Vdata is applied to the second node DTG in the fourth step I4. The first switch element T11 includes a first electrode connected to the data line DL to which the data voltage Vdata is applied, a first gate electrode connected to a fourth gate line to which the fourth gate signal SCAN is applied, a second gate electrode connected to the first gate electrode, and a second electrode connected to the second node DTG.

The second switch element T12 is turned on in response to a pulse P2 of the second gate signal INIT, which is generated as the gate-on voltage VGH, in a second step I2 and a third step I3. When the second switch element T12 is turned on, the initialization voltage Vinit is applied to the second node DTG. The second switch element T12 includes a first electrode connected to the third constant voltage node PL3 to which the initialization voltage Vinit is applied, a first gate electrode connected to a second gate line to which the second gate signal INIT is applied, a second gate electrode connected to the first gate electrode, and a second electrode connected to the second node DTG.

The third switch element T13 is turned on in response to a first pulse P3 of the third gate signal SENSE, which is generated as the gate-on voltage VGH, at the beginning of the second step I2 and the third step I3. Further, the third switch element T13 is turned on in the fifth step I5 in response to a second pulse P5 of the third gate signal SENSE, which is generated as the gate-on voltage VGH, in the low-speed driving mode. When the third switch element T13 is turned on, the reference voltage Vref is supplied to the third node DTS. The third switch element T13 includes a first electrode connected to the third node DTS, a first gate electrode connected to a third gate line to which the third gate signal SENSE is applied, a second gate electrode connected to the first gate electrode, and a second electrode connected to the fourth constant voltage node PL4 to which the reference voltage Vref is applied.

The fourth switch element T14 is turned on in response to a pulse P1 of the first gate signal PREINIT, which is generated as the gate-on voltage VGH, in a first step I1. When the fourth switch element T14 is turned on, the fourth node n14 is connected to the second constant voltage node PL2 to which the cathode voltage EVSS is applied. The fourth switch element T14 includes a gate electrode connected to a first gate line to which the first gate signal PREINIT is applied, a first electrode connected to the fourth node n14, and a second electrode connected to the second constant voltage node PL2.

The fifth switch element T15 is turned on in response to a pulse of the fifth gate signal EM1, which is generated as the gate-on voltage VGH, in the third, fourth, and sixth steps I3, I4, and I6. When the fifth switch element T15 is turned on, the first constant voltage node PL1 is connected to the first node DTD. The fifth switch element T15 includes a first gate electrode connected to a fifth gate line to which the fifth gate signal EM1 is applied, a first electrode connected to the first constant voltage node PL1, a second electrode connected to the first node DTD, and a second gate electrode connected to the second electrode.

The sixth switch element T16 is turned on in response to a pulse of the sixth gate signal EM2, which is generated as the gate-on voltage VGH, in the first, second, fifth, and sixth steps I1, I2, I5, and I6. When the sixth switch element T16 is turned on, the third node DTS is connected to the fourth node n14. The sixth switch element T16 includes a first gate electrode connected to a sixth gate line to which the sixth gate signal EM2 is applied, a first electrode connected to the third node DTS, a second electrode connected to the fourth node n14, and a second gate electrode connected to the second electrode.

A driving period of the pixel circuit may be divided into the first to sixth steps I1 to I6 defined by the gate signals PREINIT, INIT, SENSE, SCAN, EM1, and EM2 as shown in FIG. 7.

In the first step I1, the pulse P1 of a first gate signal PREINIT may be generated as the gate-on voltage VGH. In the first step I1, the voltages of the second to fifth gate signals INIT, SENSE, SCAN, and EM1 are the gate-off voltage VGL. In the first step I1, the voltage of the sixth gate signal EM2 may be the gate-on voltage VGH for discharging the anode electrode of the light emitting element EL.

The pulse P1 of the first gate signal PREINIT discharges the voltage of the second and third nodes DTG and DTS of the pixel circuit. In the first step I1, the voltage of the second node DTG is reduced to Vdata+EVSS. In the first step I1, the voltage of the third node DTS is reduced to EVSS. In the first step I1, the data voltage Vdata, which influences the voltage of the second node DTG, is the data voltage of a previous frame.

As shown in FIG. 3, in the case of a first frame period FR1 in which an input image starts to be displayed on a screen of the display panel, since there is no influence of the previous data voltage Vdata on the pixel circuit, the pulse P1 may not be generated and the voltage of the first gate signal PREINIT may be the gate-off voltage VGL in the first step I1. The pulse P1 may be generated at each frame period after the second frame period FR2.

In the second step I2, the pulse P2 of the second gate signal INIT and the first pulse P3 of the third gate signal SENSE may be generated as the gate-on voltage VGH. In the second step I2, the voltage of the first gate signal PREINT is inverted to the gate-off voltage VGL. In the second step I2, the voltages of the fourth and fifth gate signals SCAN and EM1 are the gate-off voltage VGL, and the voltage of the sixth gate signal EM2 is the gate-on voltage VGH. In the second step I2, the voltages of the second and third nodes DTG and DTS are uniformly initialized in all pixels, and the driving element DT is turned on. In the second step I2, the voltage of the second node DTG is changed from Vdata+EVSS to Vinit, and the voltage of the third node DTS is changed from EVSS to Vref.

In the third step I3, the pulse of the fifth gate signal EM1 is generated as the gate-on voltage VGH, and the voltage of the second gate signal INIT is the gate-on voltage VGH. The voltage of the third gate signal SENSE is generated as the gate-on voltage VGH at the beginning of the third step I3 and then inverted to the gate-off voltage VGL. In the third step I3, the voltages of the first, fourth, and sixth gate signals PREINIT, SCAN, and EM2 are the gate-off voltage VGL. In the third step I3, the threshold voltage Vth of the driving element DT is sensed. In the third step I3, the voltage of the second node DTG is Vinit, and the voltage of the third node DTS is Vinit−Vth.

In the fourth step I4, the voltage of the fifth gate signal EM1 is the gate-on voltage VGH, and the scan pulse P4 of the fourth gate signal SCAN is generated as the gate-on voltage VGH. In the fourth step I4, the data voltage Vdata of the pixel data synchronized to the scan pulse P4 is supplied to the data line DL. In the fourth step I4, the voltages of the first, second, third, and sixth gate signals PREINIT, INIT, SENSE, and EM2 are the gate-off voltage VGL. In step 4 I4, the voltage of the second node DTG is changed to the data voltage Vdata of a current frame, and the voltage of the third node DTS is Vinit−Vth. In the fourth step I4, the voltage of the third node DTS is changed according to the mobility of the driving element DT, so that the variation or deviation of the mobility of the driving element DT in each of the pixels may be compensated.

In the fifth step I5, the second pulse P5 of the third gate signal SENSE is generated as the gate-on voltage VGH, and the voltage of the sixth gate signal EM2 is the gate-on voltage VGH. In the fifth step I5, the voltages of the first, second, fourth, and fifth gate signals PREINIT, INIT, SCAN, and EM1 are the gate-off voltage VGL. The second pulse P5 of the third gate signal SENSE may be generated in a low-speed driving mode in which the frame frequency is lowered. The second pulse P5 does not occur in a normal driving mode with a high frame frequency, and the voltage of the third gate signal SENSE may be the gate-off voltage VGL in the fifth step I5. In step I5, the voltage of the second node DTG is reduced to Vdata+Vref, and the voltage of the third node DTS is reduced to Vref.

In step 6 I6, the voltages of the fifth and sixth gate signals EM1 and EM2 are the gate-on voltage VGH. In step 6 I6, the voltages of the first to fourth gate signals PREINIT, INIT, SCAN, and SENSE are the gate-off voltage VGL. In the sixth step I6, the light emitting element EL may be driven by a current from the driving element DT to emit light with a brightness corresponding to the gray scale value of the pixel data. In the sixth step I6, the voltage of the second node DTG is boosted to Voled+Vdata, and the voltage of the third node DTS is boosted to Voled+Vinit−Vth. Here, “Voled” is the voltage charged in the capacitor Cel of the light emitting element EL in the sixth step I6.

In the sixth step I6, the fifth gate signal EM1 may be generated as the PWM pulse. The PWM pulse may vary its duty ratio according to the DBV. The PWM pulse of the fifth gate signal EM1 may minimize or reduce an afterimage occurring in the expression of low gray scales and improve the luminance uniformity of the low gray scales by adjusting the light-on and light-off ratio, for example, the light emission duty, of the light emitting element EL, thereby enhancing the low gray scale expression ability of the pixels and reducing the leakage current of the pixels. In the sixth step I6, the third gate signal SENSE together with the fifth gate signal EM1 may also be generated as the PWM pulse. In this case, the third and fifth gate signals SENSE and EM1 may be synchronized with each other in the sixth step I6 such that when the third gate signal SENSE rises to the gate-on voltage VGH, the fifth gate signal EM1 falls to the gate-off voltage VGL, and vice versa.

Figure 8:
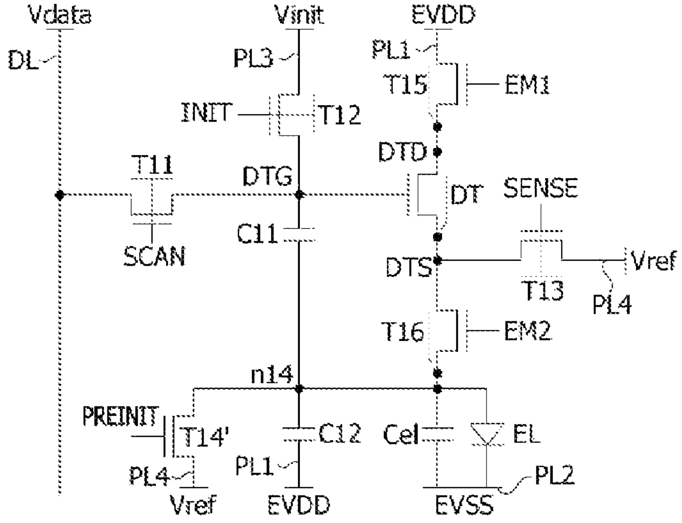
FIG. 8 is an example of a circuit diagram illustrating a pixel circuit according to a fourth embodiment of this disclosure.
Figure 9:
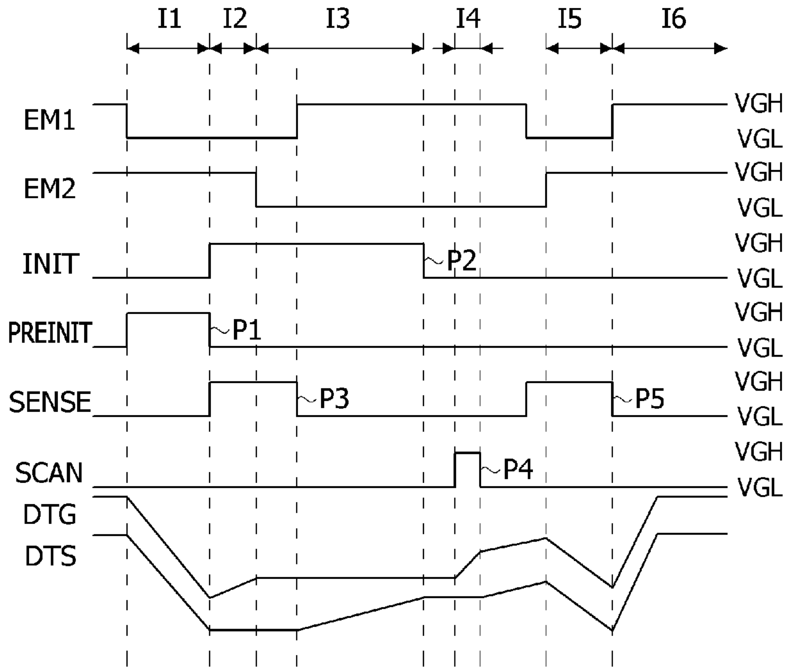
FIG. 9 is an example of a waveform diagram illustrating gate signals applied to the pixel circuit shown in FIG. 8 and voltages at main nodes thereof according to one embodiment.

FIG. 8 is a circuit diagram illustrating a pixel circuit according to a fourth embodiment of this disclosure. FIG. 9 is a waveform diagram illustrating gate signals applied to the pixel circuit shown in FIG. 8 and voltages at main nodes thereof according to one embodiment. In FIGS. 8 and 9, the components that are substantially the same as those of the third embodiment described above are designated with the same reference numerals and a detailed description thereof will be omitted or may be briefly provided.

Referring to FIGS. 8 and 9, the pixel circuit includes an emitting element EL, a driving element DT driving the emitting element EL, a plurality of switch elements T11 to T16, a first capacitor C11, and a second capacitor C12. The driving element DT and the switch elements T11 to T16 may be implemented as n-channel oxide TFTs.

A fourth switch element T14' is turned on in response to a pulse P1 of the first gate signal PREINIT, which is generated as the gate-on voltage VGH, in a first step I1. When the fourth switch element T14' is turned on, the fourth node n14 is connected to the fourth constant voltage node PL4 to which the reference voltage Vref is applied. The fourth switch element T14' includes a gate electrode connected to a first gate line to which the first gate signal PREINIT is applied, a first electrode connected to a fourth node n14, and a second electrode connected to the fourth constant voltage node PL4.

In the first step I1, a pulse P1 of a first gate signal PREINIT may be generated as the gate-on voltage VGH. In the first step I1, the voltages of the second to fifth gate signals INIT, SENSE, SCAN, and EM1 are the gate-off voltage VGL. In the first step I1, the voltage of the sixth gate signal EM2 may be the gate-on voltage VGH for discharging the anode electrode of the light emitting element EL. In the first step I1, the voltage of the second node DTG is decreased to Vdata+Vref. In the first step I1, the voltage of the third node DTS is decreased to Vref. In the first step I1, the data voltage Vdata, which influences the voltage of the second node DTG, is the data voltage of a previous frame.

As shown in FIG. 3, in the case of a first frame period FR1 in which an input image starts to be displayed on a screen of the display panel, since there is no influence of the previous data voltage Vdata on the pixel circuit, the pulse P1 may not be generated and the voltage of the first gate signal PREINIT may be the gate-off voltage VGL in the first step I1. The pulse P1 may be generated at each frame period after the second frame period FR2.

In the second step I2, a pulse P2 of the second gate signal INIT and a first pulse P3 of the third gate signal SENSE may be generated as the gate-on voltage VGH. In the second step I2, the voltage of the first gate signal PREINT is inverted to the gate-off voltage VGL. In the second step I2, the voltages of the fourth and fifth gate signals SCAN and EM1 are the gate-off voltage VGL, and the voltage of the sixth gate signal EM2 is the gate-on voltage VGH. In the second step I2, the voltages of the second and third nodes DTG and DTS are uniformly initialized in all pixels, and the driving element DT is turned on. In the second step I2, the voltage of the second node DTG changes from Vdata+Vref to Vinit, and the voltage of the third node DTS is Vref.

In the third step I3, the pulse of the fifth gate signal EM1 is generated as the gate-on voltage VGH, and the voltage of the second gate signal INIT is the gate-on voltage VGH. The voltage of the third gate signal SENSE is generated as the gate-on voltage VGH at the beginning of the third step I3 and then inverted to the gate-off voltage VGL. In the third step I3, the voltages of the first, fourth, and sixth gate signals PREINIT, SCAN, and EM2 are the gate-off voltage VGL. In the third step I3, the voltage of the second node DTG is Vinit, and the voltage of the third node DTS is Vinit−Vth.

In the fourth step I4, the voltage of the fifth gate signal EM1 is the gate-on voltage VGH, and a scan pulse P4 of the fourth gate signal SCAN is generated as the gate-on voltage VGH. In the fourth step I4, the data voltage Vdata of the pixel data synchronized to the scan pulse P4 is supplied to the data line DL. In the fourth step I4, the voltages of the first, second, third, and sixth gate signals PREINIT, INIT, SENSE, and EM2 are the gate-off voltage VGL. In step 4 I4, the voltage of the second node DTG is changed to the data voltage Vdata of a current frame, and the voltage of the third node DTS is Vinit−Vth. In the fourth step I4, the voltage of the third node DTS is changed according to the mobility of the driving element DT, so that the variation or deviation of the mobility of the driving element DT in each of the pixels may be compensated.

A second pulse P5 of the third gate signal SENSE may be generated in the fifth step I5 when the frame frequency of the input image is lowered to the frequency in the low-speed driving mode condition. The frequency of this pulse P5 may be controlled to be constant without changing even if the frequency changes in the low-speed driving mode. Voltage changes in the third node DTS when the frame frequency of the input image is lowered may be reduced or prevented by the pulse P5 generated at a constant frequency.

In the fifth step I5, the second pulse P5 of the third gate signal SENSE is generated as the gate-on voltage VGH, and the voltage of the sixth gate signal EM2 is the gate-on voltage VGH. In the fifth step I5, the voltages of the first, second, fourth, and fifth gate signals PREINIT, INIT, SCAN, and EM1 are the gate-off voltage VGL. The second pulse P5 of the third gate signal SENSE may be generated in a low-speed driving mode in which the frame frequency is lowered. The second pulse P5 does not occur in a normal driving mode with a high frame frequency, and the voltage of the third gate signal SENSE may be the gate-off voltage VGL in the fifth step I5. In step I5, the voltage of the second node DTG is reduced to Vdata+Vref, and the voltage of the third node DTS is reduced to Vref.

In step 6 I6, the voltages of the fifth and sixth gate signals EM1 and EM2 are the gate-on voltage VGH. In step 6 I6, the voltages of the first to fourth gate signals PREINIT, INIT, SCAN, and SENSE are the gate-off voltage VGL. In the sixth step I6, the light emitting element EL may be driven by a current from the driving element DT to emit light with a brightness corresponding to the gray scale value of the pixel data. In the sixth step I6, the voltage of the second node DTG is boosted to Voled+Vdata, and the voltage of the third node DTS is boosted to Voled+Vinit−Vth. Here, "Voled" is the voltage charged in the capacitor Cel of the light emitting element EL in the sixth step I6.

In the sixth step I6, the fifth gate signal EM1 may be generated as the PWM pulse. The PWM pulse may vary its duty ratio according to the DBV. The PWM pulse of the fifth gate signal EM1 may minimize or reduce an afterimage occurring in the expression of low gray scales and improve the luminance uniformity of the low gray scales by adjusting the light-on and light-off ratio, for example, the light emission duty, of the light emitting element EL, thereby enhancing the low gray scale expression ability of the pixels and reducing the leakage current of the pixels. In the sixth step I6, the third gate signal SENSE together with the fifth gate signal EM1 may also be generated as the PWM pulse. In this case, the third and fifth gate signals SENSE and EM1 may be synchronized with each other in the sixth step I6 such that when the third gate signal SENSE rises to the gate-on voltage VGH, the fifth gate signal EM1 falls to the gate-off voltage VGL, and vice versa.

Figure 10:
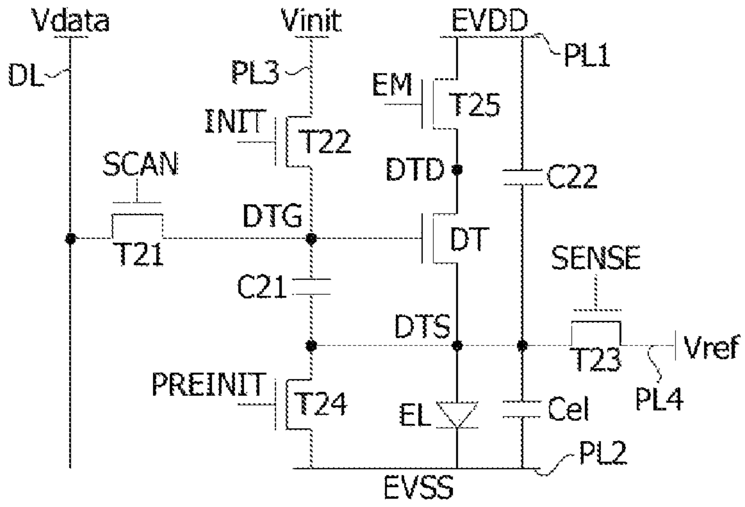
FIG. 10 is an example of a circuit diagram illustrating a pixel circuit according to a fifth embodiment of this disclosure.
Figure 11:
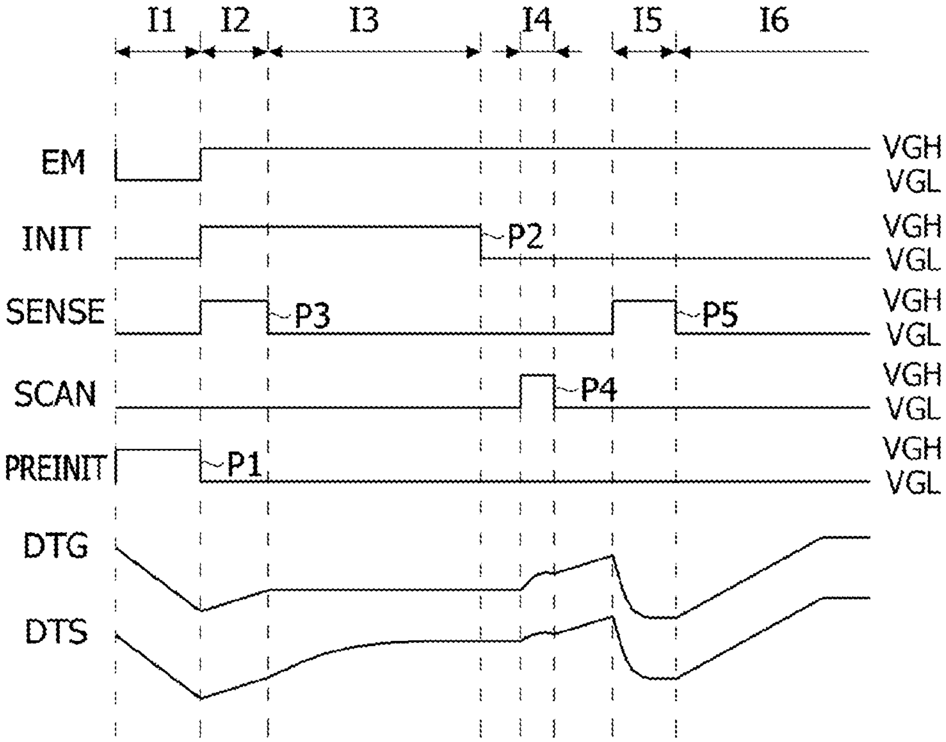
FIG. 11 is an example of a waveform diagram illustrating gate signals applied to the pixel circuit shown in FIG. 10 and voltages at main nodes thereof according to one embodiment.

FIG. 10 is a circuit diagram illustrating a pixel circuit according to a fifth embodiment of this disclosure. FIG. 11 is a waveform diagram illustrating gate signals applied to the pixel circuit shown in FIG. 10 and voltages at main nodes thereof according to one embodiment.

Referring to FIGS. 10 and 11, the pixel circuit includes an emitting element EL, a driving element DT driving the emitting element EL, a plurality of switch elements T21 to T25, a first capacitor C21, and a second capacitor C22. The driving element DT and the switch elements T21 to T25 may be implemented as n-channel oxide TFTs.

The constant voltages applied to the pixel circuit, the gate signals, the data voltage of the pixel circuit, and the like may be set in the same manner as the aforementioned embodiments.

The light emitting element EL may be implemented as an OLED. The OLED includes an organic compound layer formed between an anode electrode connected to the third node DTS and a cathode electrode to which the cathode voltage EVSS is applied. The organic compound layer may include, but is not limited to, a hole injection layer HIL, a hole transport layer HTL, an emission layer EML, an electron transport layer ETL, and an electron injection layer EIL.

The driving element DT generates a current according to the gate-source voltage Vgs to drive the light emitting element EL. The driving element DT includes a first electrode connected to a first node DTD, a gate electrode connected to a second node DTG, and a second electrode connected to the third node DTS. The first node DTD may be connected to the first constant voltage node PL1 to which the pixel driving voltage EVDD is applied.

The first capacitor C21 is connected between the second node DTG and the third node DTS to store the gate-source voltage of the driving element DT. The second capacitor C22 is connected between the first constant voltage node PL1 and the third node DTS to increase the transfer efficiency of the data voltage Vdata being charged in the first capacitor C21. The first and second capacitors C21 and C22 may be set to the same capacitance or different capacitances.

The switch elements T21 to T25 of the pixel circuit include a first switch element T21 that supplies the data voltage Vdata of pixel data to the second node DTG in response to the fourth gate signal SCAN, a second switch element T22 that supplies the initialization voltage Vinit to the second node DTG in response to the second gate signal INIT, a third switch element T23 that supplies the reference voltage Vref to the third node DTS in response to the third gate signal SENSE, a fourth switch element T24 that connects the third node DTS to the second constant voltage node PL2, in response to the first gate signal PREINIT, to which the cathode voltage EVSS is applied, and a fifth switch element T25 that connects the first constant voltage node PL1 to the first node DTD in response to the fifth gate signal EM.

The first switch element T21 is turned on in response to a scan pulse P4 of the fourth gate signal SCAN synchronized to the data voltage Vdata of the pixel data in a fourth step I4. The scan pulse P4 is generated as the gate-on voltage VGH. When the first switch element T21 is turned on, the data line DL is connected to the second node DTG. Therefore, a data voltage Vdata is applied to the second node DTG in the fourth step I4. The first switch element T21 includes a first electrode connected to the data line DL to which the data voltage Vdata is applied, a gate electrode connected to a fourth gate line to which the fourth gate signal SCAN is applied, and a second electrode connected to the second node DTG.

The second switch element T22 is turned on in response to a pulse P2 of the second gate signal INIT, which is generated as the gate-on voltage VGH, in a second step I2 and a third step I3. When the second switch element T22 is turned on, the initialization voltage Vinit is applied to the second node DTG. The second switch element T22 includes a first electrode connected to the third constant voltage node PL3 to which the initialization voltage Vinit is applied, a gate electrode connected to a second gate line to which the second gate signal INIT is applied, and a second electrode connected to the second node DTG.

The third switch element T23 is turned on in response to a first pulse P3 of the third gate signal SENSE, which is generated as the gate-on voltage VGH, in the second step I2. Further, the third switch element T23 is turned on in the fifth step I5 in response to a second pulse P5 of the third gate signal SENSE, which is generated as a gate-on voltage VGH, in the low-speed driving mode. When the third switch element T23 is turned on, the reference voltage Vref is supplied to the third node DTS. The third switch element T23 includes a first electrode connected to the third node DTS, a gate electrode connected to a third gate line to which the third gate signal SENSE is applied, and a second electrode connected to the fourth constant voltage node PL4 to which the reference voltage Vref is applied.

The fourth switch element T24 is turned on in response to a pulse P1 of the first gate signal PREINIT, which is generated as the gate-on voltage VGH, in a first step I1. When the fourth switch element T24 is turned on, the third node DTS is connected to the second constant voltage node PL2 to which the cathode voltage EVSS is applied. The fourth switch element T24 includes a gate electrode connected to a first gate line to which the first gate signal PREINIT is applied, a first electrode connected to the third node DTS, and a second electrode connected to the second constant voltage node PL2.

The fifth switch element T25 is turned on in response to a pulse of the fifth gate signal EM, which is generated as a gate-on voltage VGH, in the second to sixth steps I2 to I6. When the fifth switch element T25 is turned on, the first constant voltage node PL1 is connected to the first node DTD. The fifth switch element T25 includes a gate electrode connected to a fifth gate line to which the fifth gate signal EM is applied, a first electrode connected to the first constant voltage node PL1, and a second electrode connected to the first node DTD.

The driving period of the pixel circuit may be divided into the first to sixth steps I1 to I6 defined by the gate signals PREINIT, INIT, SENSE, SCAN, and EM as shown in FIG. 11.

In the first step I1, a pulse P1 of a first gate signal PREINIT may be generated as the gate-on voltage VGH. In the first step I1, the voltages of the second to fifth gate signals INIT, SENSE, SCAN, and EM are the gate-off voltage VGL.

The pulse P1 of the first gate signal PREINIT discharges the voltage of the second and third nodes DTG and DTS of the pixel circuit. This pulse P1 may allow the voltages of the second and third nodes DTG and DTS, resulting from due to the data voltage Vdata that has been applied in a previous frame period, to be uniform in each of the pixels. In the first step I1, the voltage of the second node DTG is reduced to Vdata+EVSS. In the first step I1, the voltage of the third node DTS is reduced to EVSS. In the first step I1, the data voltage Vdata, which influences the voltage of the second node DTG, is the data voltage of a previous frame.

As shown in FIG. 3, in the case of a first frame period FR1 in which an input image starts to be displayed on a screen of the display panel, since there is no influence of the previous data voltage Vdata on the pixel circuit, the pulse P1 may not be generated and the voltage of the first gate signal PREINIT may be the gate-off voltage VGL in the first step I1. The pulse P1 may be generated at each frame period after the second frame period FR2.

In the second step I2, a pulse P2 of the second gate signal INIT, a first pulse P3 of the third gate signal SENSE, and a pulse of the fifth gate signal EM may be generated as the gate-on voltage VGH. In the second step I2, the voltage of the first gate signal PREINT is inverted to the gate-off voltage VGL. In the second step I2, the voltage of the fourth gate signal SCAN is the gate-off voltage VGL. In the second step I2, the voltages of the second and third nodes DTG and DTS are uniformly initialized in all pixels, and the driving element DT is turned on. In the second step I2, the voltage of the second node DTG is changed from Vdata+EVSS to Vinit, and the voltage of the third node DTS is changed from EVSS to Vref.

In the third step I3, the voltages of the second gate signal INIT and the fifth gate signal EM are the gate-on voltage VGH. In step I3, the voltages of the first, third, and fourth gate signals PREINIT, SENSE, and SCAN are the gate-off voltage VGL. In the third step I3, when the voltage of the third node DTS rises and the gate-source voltage Vgs of the driving element DT becomes lower than the threshold voltage Vth of the driving element DT, the driving element DT is turned off and the threshold voltage Vth is charged in the capacitor C21. Therefore, in the third step I3, the threshold voltage Vth of the driving element DT is sensed. In the third step I3, the voltage of the second node DTG is Vinit, and the voltage of the third node DTS is Vinit−Vth.

In the fourth step I4, the voltage of the fifth gate signal EM is the gate-on voltage VGH, and the scan pulse P4 of the fourth gate signal SCAN is generated as the gate-on voltage VGH. In the fourth step I4, the data voltage Vdata of the pixel data synchronized to the scan pulse P4 is supplied to the data line DL. In the fourth step I4, the voltages of the first, second, and third gate signals PREINIT, INIT, and SENSE are the gate-off voltage VGL. In step 4 I4, the voltage of the second node DTG is changed to the data voltage Vdata of a current frame, and the voltage of the third node DTS is Vinit−Vth. In the fourth step I4, the voltage of the third node DTS is changed according to the mobility 'p' of the driving element DT, so that the variation or deviation of the mobility of the driving element DT in each of the pixels may be compensated.

A second pulse P5 of the third gate signal SENSE may be generated in the fifth step I5 when the frame frequency of the input image is lowered to the frequency in the low-speed driving mode condition. The frequency of this pulse P5 may be controlled to be constant without changing even if the frequency changes in the low-speed driving mode. Voltage changes in the third node DTS when the frame frequency of the input image is lowered may be reduced or prevented by the pulse P5 generated at a constant frequency.

In the fifth step I5, a second pulse P5 of the third gate signal SENSE is generated as a gate-on voltage VGH, and the voltage of the fifth gate signal EM is the gate-on voltage VGH. In the fifth step I5, the voltages of the first, second, and fourth gate signals PREINIT, INIT, and SCAN are the gate-off voltage VGL. The second pulse P5 of the third gate signal SENSE may be generated in a low-speed driving mode in which the frame frequency is lowered. The second pulse P5 does not occur in a normal driving mode with a high frame frequency, and the voltage of the third gate signal SENSE may be the gate-off voltage VGL in the fifth step I5. In step I5, the voltage of the second node DTG is reduced to Vdata+Vref, and the voltage of the third node DTS is reduced to Vref.

In step 6 I6, the voltage of the fifth gate signal EM is the gate-on voltage VGH. In step 6 I6, the voltages of the first to fourth gate signals PREINIT, INIT, SCAN, and SENSE are the gate-off voltage VGL. In the sixth step I6, the light emitting element EL may be driven by a current from the driving element DT to emit light with a brightness corresponding to the gray scale value of the pixel data. In the sixth step I6, the voltage of the second node DTG is boosted to Voled+Vdata, and the voltage of the third node DTS is boosted to Voled+Vinit−Vth. Here, "Voled" is the voltage charged in the capacitor Cel of the light emitting element EL in the sixth step I6.

In the sixth step I6, the fifth gate signal EM may be generated as a PWM pulse. The PWM pulse may vary its duty ratio according to the DBV. The PWM pulse of the fifth gate signal EM may minimize or reduce an afterimage occurred when expressing low-gray scales and improve the luminance uniformity of the low-gray scales by adjusting the light-on and light-off ratio of the light emitting element EL, for example, the light emission duty, thereby enhancing the low-gray scale expression capability of the pixels and reducing the leakage current of the pixels. In the sixth step I6, the third gate signal SENSE together with the fifth gate signal EM may also be generated as the PWM pulse.

Figure 12:
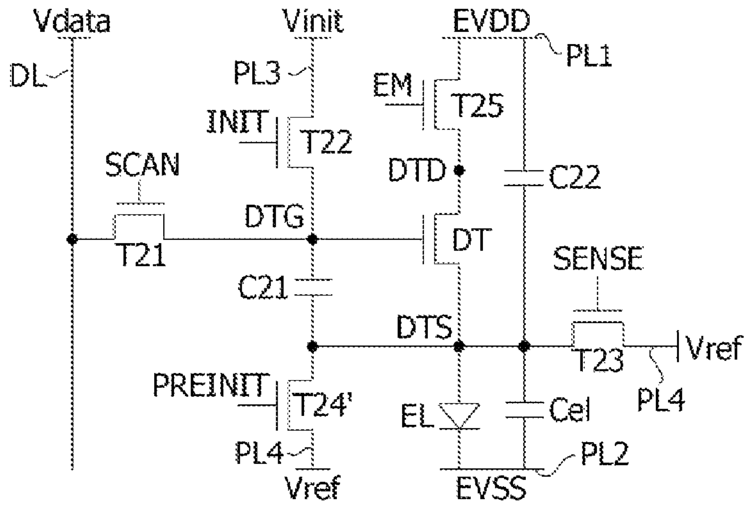
FIG. 12 is an example of a circuit diagram illustrating a pixel circuit according to a six embodiment of the present disclosure.
Figure 13:
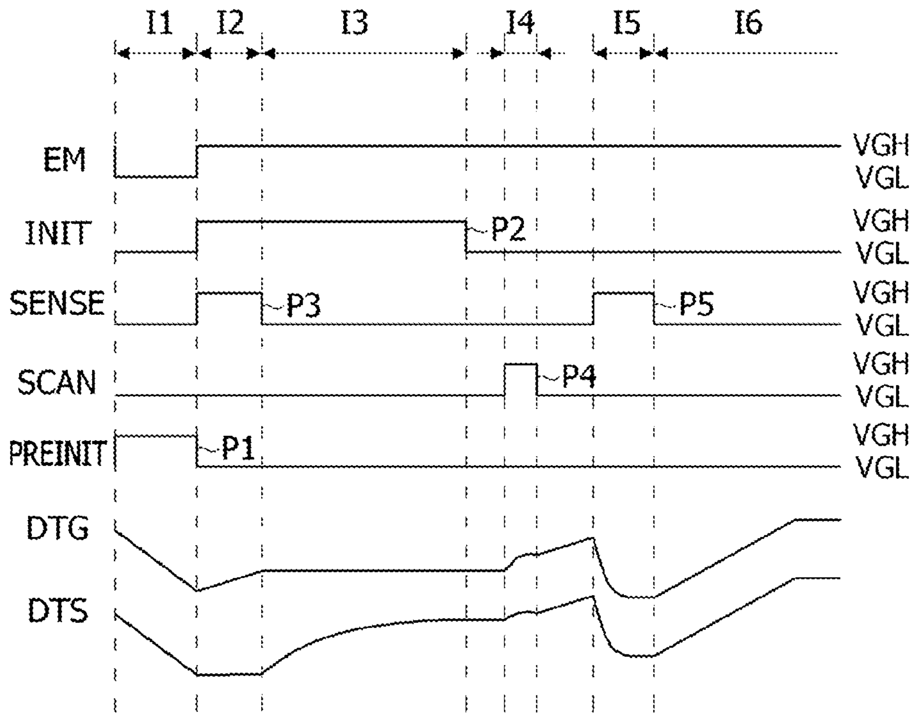
FIG. 13 is an example of a waveform diagram illustrating gate signals applied to the pixel circuit shown in FIG. 12 and voltages at main nodes thereof according to one embodiment.

FIG. 12 is a circuit diagram illustrating a pixel circuit according to a six embodiment of the present disclosure. FIG. 13 is a waveform diagram illustrating gate signals applied to the pixel circuit shown in FIG. 12 and voltages at main nodes thereof according to one embodiment. In FIGS. 12 and 13, the components that are substantially the same as those of the fifth embodiment described above are designated with the same reference numerals and a detailed description thereof will be omitted or may be briefly provided.

Referring to FIGS. 12 and 13, the pixel circuit includes an emitting element EL, a driving element DT that drives the emitting element EL, a plurality of switch elements T21 to T25, a first capacitor C21, and a second capacitor C22. The driving element DT and the switch elements T21 to T25 may be implemented as n-channel oxide TFTs.

A fourth switch element T24' is turned on in response to a pulse P1 of the first gate signal PREINIT, which is generated as the gate-on voltage VGH, in a first step I1. When the fourth switch element T24' is turned on, the third node DTS is connected to the fourth constant voltage node PL4 to which the reference voltage Vref is applied. The fourth switch element T24' includes a gate electrode connected to a first gate line to which the first gate signal PREINIT is applied, a first electrode connected to the third node DTS, and a second electrode connected to the fourth constant voltage node PL4.

In the first and second steps I1 and I2, the pixel circuit is initialized. In the first step I1, a pulse P1 of a first gate signal PREINIT may be generated as the gate-on voltage VGH. In the first step I1, the voltages of the second to fifth gate signals INIT, SENSE, SCAN, and EM are the gate-off voltage VGL. In the first step I1, the voltage of the second node DTG is decreased to Vdata+Vref. In the first step I1, the voltage of the third node DTS is decreased to Vref. In the first step I1, the data voltage Vdata, which influences the voltage of the second node DTG, is the data voltage of a previous frame.

As shown in FIG. 3, in the case of a first frame period FR1 in which an input image starts to be displayed on a screen of the display panel, since there is no influence of the previous data voltage Vdata on the pixel circuit, the pulse P1 may not be generated and the voltage of the first gate signal PREINIT may be the gate-off voltage VGL in the first step I1. The pulse P1 may be generated at each frame period after the second frame period FR2.

In the second step I2, a pulse P2 of the second gate signal INIT, a first pulse P3 of the third gate signal SENSE, and a pulse of the fifth gate signal EM may be generated as the gate-on voltage VGH. In the second step I2, the voltage of the first gate signal PREINT is inverted to the gate-off voltage VGL. In the second step I2, the voltage of the fourth gate signal SCAN is the gate-off voltage VGL. In the second step I2, the voltages of the second and third nodes DTG and DTS are uniformly initialized in all pixels, and the driving element DT is turned on. In the second step I2, the voltage of the second node DTG changes from Vdata+Vref to Vinit, and the voltage of the third node DTS is Vref.

In the third step I3, the pulses of the second and fifth gate signals INIT and EM are generated as the gate-on voltage VGH. In step I3, the voltages of the first, third, and fourth gate signals PREINIT, SENSE, and SCAN are the gate-off voltage VGL. In the third step I3, the voltage of the second node DTG is Vinit, and the voltage of the third node DTS is Vinit−Vth.

In the fourth step I4, the voltage of the fifth gate signal EM is the gate-on voltage VGH, and the scan pulse P4 of the fourth gate signal SCAN is generated as the gate-on voltage VGH. In the fourth step I4, the data voltage Vdata of the pixel data synchronized to the scan pulse P4 is supplied to the data line DL. In the fourth step I4, the voltages of the first, second, and third gate signals PREINIT, INIT, and SENSE are the gate-off voltage VGL. In step 4 I4, the voltage of the second node DTG is changed to the data voltage Vdata of a current frame, and the voltage of the third node DTS is Vinit−Vth. In the fourth step I4, the voltage of the third node DTS is changed according to the mobility of the driving element DT, so that the variation or deviation of the mobility of the driving element DT in each of the pixels may be compensated.

In the fifth step I5, a second pulse P5 of the third gate signal SENSE is generated as a gate-on voltage VGH, and the voltage of the fifth gate signal EM is the gate-on voltage VGH. In the fifth step I5, the voltages of the first, second, and fourth gate signals PREINIT, INIT, and SCAN are the gate-off voltage VGL. The second pulse P5 of the third gate signal SENSE may be generated in a low-speed driving mode in which the frame frequency is lowered. The second pulse P5 does not occur in a normal driving mode with a high frame frequency, and the voltage of the third gate signal SENSE may be the gate-off voltage VGL in the fifth step I5. In step I5, the voltage of the second node DTG is reduced to Vdata+Vref, and the voltage of the third node DTS is reduced to Vref.

In step 6 I6, the voltage of the fifth gate signal EM is the gate-on voltage VGH. In step 6 I6, the voltages of the first to fourth gate signals PREINIT, INIT, SCAN, and SENSE are the gate-off voltage VGL. In the sixth step I6, the light emitting element EL may be driven by a current from the driving element DT to emit light with a brightness corresponding to the gray scale value of the pixel data. In the sixth step I6, the voltage of the second node DTG is boosted to Voled+Vdata, and the voltage of the third node DTS is boosted to Voled+Vinit−Vth. Here, "Voled" is the voltage charged in the capacitor Cel of the light emitting element EL in the sixth step I6.

In the sixth step I6, the fifth gate signal EM may be generated as a PWM pulse. The PWM pulse may vary its duty ratio according to the DBV. The PWM pulse of the fifth gate signal EM may minimize or reduce an afterimage occurred when expressing low-gray scales and improve the luminance uniformity of the low-gray scales by adjusting the light-on and light-off ratio of the light emitting element EL, for example, the light emission duty, thereby enhancing the low-gray scale expression capability of the pixels and reducing the leakage current of the pixels. In the sixth step I6, the third gate signal SENSE together with the fifth gate signal EM may also be generated as the PWM pulse.

It is to be noted that although the embodiments of FIG. 10 and FIG. 12 are described as the switch elements being formed of a single-gate structure, rather than the double-gate structure shown in FIG. 6 and FIG. 8, but the present disclosure is not limited thereto. the switch elements of FIG. 10 and FIG. 10 may also be implemented with the double-gate structure.

Further, it is to be noted that although the above embodiments shown in FIGS. 1 to 13 disclose some example structures of the pixel circuit, the present disclosure is not limited thereto. For example, as long as the pixel circuit is structured such that a low-potential cathode voltage EVSS or a reference voltage Vref is applied to nodes of the pixel circuit in a pre-initial period before the pixel circuit is initialized, the pixel circuit of the present disclosure may have various structures.

Figure 14:
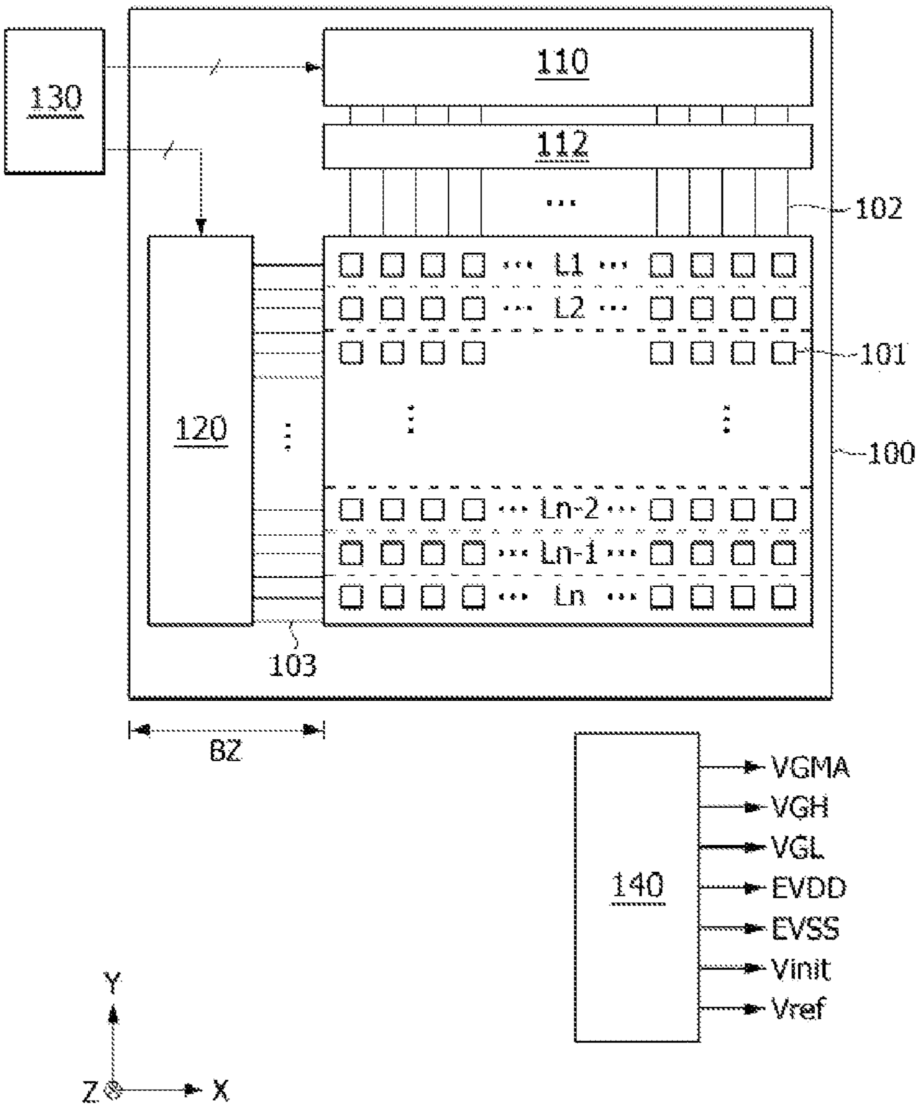
FIG. 14 is an example of a block diagram illustrating a display device according to one embodiment of the present disclosure.
Figure 15:
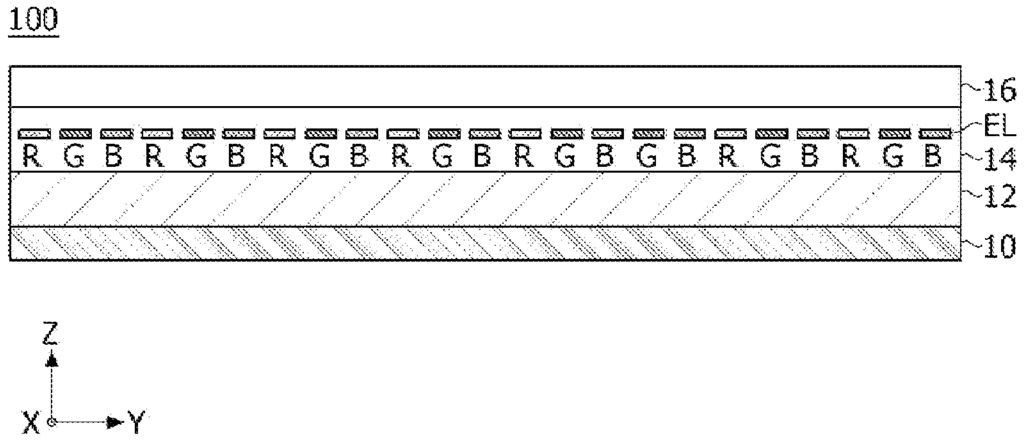
FIG. 15 is an example of a cross-sectional view illustrating a cross-sectional structure of the display panel shown in FIG. 14 according to one embodiment.

FIG. 14 is a block diagram illustrating a display device according to one embodiment of the present disclosure. FIG. 15 is a cross-sectional view illustrating a cross-sectional structure of the display panel shown in FIG. 14 according to one embodiment.

Referring to FIGS. 14 and 15, the display device according to an embodiment of the present disclosure includes a display panel 100, a display panel driver for writing pixel data to pixels of the display panel 100, and a power supply 140 for generating power necessary to drive the pixels and the display panel driver.

The display panel 100 may be a panel having a rectangular structure with a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 intersected with the data lines 102, and pixels arranged in a matrix form. The display panel 100 may further include power lines commonly connected to the pixels. The power lines supply a constant voltage necessary for driving the pixels 101 to the pixels 101. For example, the display panel 100 may include a power line from which a pixel driving voltage EVDD is applied, a power line from which a low-potential cathode voltage EVSS is applied, a power line from which a reference voltage Vref is applied, a power line from which an initialization voltage Vinit is applied, and the like.

A cross-sectional structure of the display panel 100 may include a circuit layer 12, a light emitting element layer 14, and an encapsulation layer 16 stacked on the substrate 10, as shown in FIG. 15.

The circuit layer 12 may include a thin-film transistor (TFT) array including a pixel circuit connected to wirings such as a data line, a gate line, a power line, and the like, a de-multiplexer array 112, and a gate driver 120. The wirings and circuit elements in the circuit layer 12 may include a plurality of insulating layers, two or more metal layers separated with the insulating layer therebetween, and an active layer including a semiconductor material. All transistors formed in the circuit layer 12 may be implemented as an n-channel oxide TFT.

The light emitting element layer 14 may include a light emitting element EL driven by the pixel circuit. The light-emitting elements EL may include a red (R) light-emitting element, a green (G) light-emitting element, and a blue (B) light-emitting element. In another embodiment, the light-emitting element layer 14 may include a white light-emitting element and a color filter. The light emitting elements EL in the light emitting element layer 14 may be covered by multiple protective layers including an organic film and an inorganic film.

An encapsulation layer 16 covers the light emitting element layer 14 to seal the circuit layer 12 and the light emitting element layer 14. The encapsulation layer 16 may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture and oxygen becomes longer than that of a single layer, so that penetration of moisture and oxygen affecting the light emitting element layer 14 may be effectively blocked.

A touch sensor layer (not shown) may be formed on the encapsulation layer 16, and a polarizing plate or a color filter layer may be disposed thereon. The touch sensor layer may include capacitive touch sensors that sense a touch input based on a change in capacitance before and after the touch input. The touch sensor layer may include metal wiring patterns and insulating films forming the capacitance of the touch sensors. The insulating films may insulate a portion where the metal wiring patterns are intersected, and may planarize the surface of the touch sensor layer. The polarizing plate may improve visibility and contrast ratio by converting the polarization of external light reflected by metal in the touch sensor layer and the circuit layer. The polarizer may be implemented as a polarizer or a circular polarizer to which a linear polarizer and a phase retardation film are bonded. A cover glass may be adhered to the polarizing plate. The color filter layer may include red, green, and blue color filters. The color filter layer may further include a black matrix pattern. The color filter layer may replace the polarizing plate by absorbing a part of the wavelength of light reflected from the circuit layer and the touch sensor layer, and increase the color purity of an image reproduced in the pixel array.

The pixel array includes a plurality of pixel lines L1 to Ln. Each of the pixel lines L1 to Ln includes one line of pixels arranged along the line direction (X-axis direction) in the pixel array of the display panel 100. Pixels arranged in one pixel line share the gate lines 103. Sub-pixels arranged in the column direction Y along a data line direction share the same data line 102. One horizontal period is a time obtained by dividing one frame period 1FR by the total number of pixel lines L1 to Ln.

The display panel 100 may be implemented with a non-transmissive display panel or a transmissive display panel. The transmissive display panel may be applied to a transparent display device in which an image is displayed on a screen and an actual object in the background is visible. The display panel 100 may be manufactured as a flexible display panel.

Each of the pixels 101 may be divided into a red sub-pixel, a green sub-pixel, and a blue sub-pixel for color implementation. Each of the pixels may further include a white sub-pixel. Each of the sub-pixels may be implemented with any of the pixel circuits described above. Hereinafter, a pixel may be interpreted as having the same meaning as a sub-pixel. Each of the pixel circuits is connected to data lines, gate lines, and power lines.

The pixels may be arranged as real color pixels and pentile pixels. A pentile pixel may realize a higher resolution than the real color pixel by driving two sub-pixels having different colors as one pixel 101 through the use of a preset pixel rendering algorithm. Pixel rendering algorithms may compensate for insufficient color representation in each pixel with the color of light emitted from an adjacent pixel.

The power supply 140 generates a DC voltage (or constant voltage) necessary for driving the pixel array of the display panel 100 and the display panel driver by using a DC-DC converter. The DC-DC converter may include a charge pump, a regulator, a buck converter, a boost converter, and the like. The power supply 140 may generate constant voltages such as a gamma reference voltage VGMA, a gate-on voltage VGH, a gate-off voltage VGL, a pixel driving voltage EVDD, a low potential cathode voltage EVSS, an initialization voltage Vinit, and a reference voltage Vref by adjusting the level of a DC input voltage applied from a host system, which is not shown. The gamma reference voltage VGMA is supplied to the data driver 110. The gate-on voltage VGH and the gate-off voltage VGL are supplied to the gate driver 120. Constant voltages such as a pixel driving voltage EVDD, a cathode voltage EVSS, an initialization Vinit, and a reference voltage Vref are supplied to the pixels 101 via the power lines commonly connected to the pixels 101.

The display panel driver writes the pixel data of the input image to the pixels of the display panel 100 under the control of a timing controller 130.

The display panel driver includes the data driver 110 and the gate driver 120. The display panel driver may further include a de-multiplexer array 112 disposed between the data driver 110 and the data lines 102.

The de-multiplexer array 112 sequentially supplies the data voltages outputted from channels of the data driver 110 to the data lines 102 using a plurality of de-multiplexers DEMUX. The de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted or may be briefly provided.

The display panel driver may further include a touch sensor driver for driving the touch sensors. The touch sensor driver is omitted from FIG. 14. The data driver 110 and the touch sensor driver may be integrated into one drive IC (Integrated Circuit). In mobile devices or wearable devices, the timing controller 130, the power supply 140, the data driver 110, and the like may be integrated into one drive IC.

The display panel driver may operate in a low-speed driving mode under the control of the timing controller 130. The low-speed driving mode may be set to reduce power consumption of the display device when an input image does not change during a preset number of frames as a result of analyzing the input image. In the low-speed driving mode, the power consumption in the display panel driver and the display panel 100 may be reduced by lowering the frame frequency, for example, refresh rate, at which pixel data is written to the pixels when a still image is inputted for a predetermined time or longer. The low-speed driving mode is not limited to a case where the still image is inputted. For example, when the display device operates in a standby mode or when a user command or an input image is not inputted to the display panel driver for a predetermined time or longer, the display panel driver may operate in the low-speed driving mode.

The data driver 110 receives pixel data of the input image received as a digital signal from the timing controller 130 and outputs a data voltage. The data driver 110 generates the data voltage Vdata by converting the pixel data of the input image into a gamma compensation voltage every frame period using a digital to analog converter (DAC). The gamma reference voltage VGMA is divided by a voltage divider circuit into a gamma compensation voltage for each gray scale. The gamma compensation voltage for each gray scale is provided to the DAC in the data driver 110. The data voltage Vdata is outputted through an output buffer from each of the channels of the data driver 110.

The gate driver 120 may be implemented as a gate in panel (GIP) circuit formed in the circuit layer 12 on the display panel 100 together with the TFT array of the pixel array and wirings. The gate driver 120 may be disposed in a bezel BZ, which is non-display region of the display panel 100, or may be distributed and disposed in a pixel array in which an input image is reproduced. The gate driver 120 sequentially outputs gate signals to the gate lines 103 under the control of the timing controller 130. The gate driver 120 may sequentially supply the gate signals to the gate lines 103 by shifting the gate signals using a shift register.

The gate signals PREINIT, INIT, SENSE, SCAN, EM, EM1, and EM2 include a first gate signal PREINIT, a second gate signal INIT, a third gate signal SENSE, a fourth gate signal SCAN, fifth gate signals EM, EM1, and a sixth gate signal EM2. These gate signals are generated by the gate driver 120. The gate driver 120 may include a first shift register that generates the first gate signal PREINIT, a second shift register that generates the second gate signal INIT, a third shift register that generates the third gate signal SENSE, a fourth shift register that generates the fourth gate signal SCAN, a fifth shift register that generates the fifth gate signals EM, EM1, and a sixth shift register that generates the sixth gate signal EM2.

The timing controller 130 receives, from the host system, digital video data DATA of an input image and a timing signal synchronized with the digital video data. The timing signals may include a vertical synchronization signal Vsync, a horizontal synchronization signal Hsync, a clock CLK, and a data enable signal DE. Since a vertical period and a horizontal period may be known by counting the data enable signal DE, the vertical synchronization signal Vsync and the horizontal synchronization signal Hsync may be omitted. The data enable signal DE has a cycle of one horizontal period (1H).

The host system may be one of a television (TV) system, a tablet computer, a notebook computer, a navigation system, a personal computer (PC), a home theater system, a mobile device, a wearable device, and a vehicle system. The host system may scale the image signal from the video source to fit the resolution of the display panel 100, and may transmit it to the timing controller 130 together with the timing signal.

The timing controller 130 may multiply the input frame frequency by i (i is a natural number) in the normal driving mode, so that it can control the operation timing of the display panel driver at a frame frequency of the input frame frequency×i Hz. The input frame frequency is 60 Hz in a national television standards committee (NTSC) system and 50 Hz in a phase-alternating line (PAL) system.

A host system or the timing controller 130 may vary the frame frequency to match the movement or content characteristics of the input image.

In the low-speed driving mode, the timing controller 130 reduces a frequency of a frame rate at which pixel data is written to pixels, compared to a normal driving mode. For example, a data refresh frame frequency at which pixel data is written to pixels in the normal driving mode may occur at a refresh rate of 60 Hz or higher, e.g., any one of 60 Hz, 120 Hz, 144 Hz or 240 Hz, and the frame frequency in the low-speed driving mode may be set at a frequency lower than that in the normal driving mode. In order to lower the refresh rate of the pixels in the low-speed driving mode, the timing controller 130 may reduce the driving frequency of the display panel driver by reducing the frame frequency.

The timing controller 130 generates a data timing control signal for controlling the operation timing of the data driver 110 based on the timing signals Vsync, Hsync, and DE received from the host system, a control signal for controlling the operation timing of the de-multiplexer array 112, and a gate timing control signal for controlling the operation timing of the gate driver 120. The timing controller 130 synchronizes the data driver 110, the de-multiplexer array 112, the touch sensor driver, and the gate driver 120 by controlling the operation timing of the display panel driver.

The gate timing control signal generated from the timing controller 130 may be inputted to the shift register of the gate driver 120 through a level shifter (not shown). The level shifter may receive the gate timing control signal and generate a start pulse and a shift clock to provide them to the shift registers of the gate driver 120.

The objects to be achieved by the present disclosure, the means for achieving the objects, and advantages and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and can be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit comprising:

a driving element including a first electrode connected to a first node, a gate electrode connected to a second node, and a second electrode connected to a third node;

a light emitting element including an anode electrode connected to a fourth node, the light emitting element configured to be driven according to a current from the driving element;

a first switch element configured to supply a data voltage to the second node;

a second switch element configured to supply an initialization voltage to the first node;

a third switch element configured to supply a reference voltage to the third node or the fourth node; and a fourth switch element configured to supply a cathode voltage or the reference voltage to the third node or the fourth node, wherein the fourth switch element is configured to be turned on in response to a pulse of a first gate signal in a first step to apply the cathode voltage or the reference voltage to the third node or the fourth node, wherein the second switch element is configured to be turned on in response to a pulse of a second gate signal after the first step to apply the initialization voltage to the second node, and wherein the third switch element is configured to be turned on in response to a first pulse of a third gate signal occurring after the first step to apply the reference voltage to the third node or the fourth node, wherein a waveform of the third gate signal is different from a waveform of the second gate signal, and each of the initialization voltage, the reference voltage, and the cathode voltage is a constant voltage.

2. The pixel circuit of claim 1, further comprising:

a fifth switch element configured to supply a pixel driving voltage to the first node, wherein the second switch element is configured to be turned on in response to a pulse of a second gate signal in a second step and a third step after the first step to apply the initialization voltage to the second node, wherein the third switch element is configured to be turned on in response to a first pulse of a third gate signal occurring in the second step or both in the second step and a beginning of the third step to apply the reference voltage to the third node or the fourth node, wherein the first switch element is configured to be turned on in response to a pulse of a fourth gate signal in a fourth step after the third step to apply the data voltage to the second node, and wherein the fifth switch element is configured to be turned on in response to a pulse of a fifth gate signal in the third step, the fourth step, and a sixth step after a fifth step to apply the pixel driving voltage to the first node.

3. The pixel circuit of claim 2, wherein the first step to the sixth step form one frame period for displaying an image.

4. The pixel circuit of claim 2, wherein a threshold voltage of the light emitting element is sensed during the third step, and the light emitting element emits light during the sixth step.

5. The pixel circuit of claim 2, further comprising:

a first capacitor connected between the second node and the third node or between the second node and the fourth node; and a second capacitor connected between a first constant voltage node to which the pixel driving voltage is applied and the third node or between the first constant voltage node and the fourth node.

6. The pixel circuit of claim 2, wherein the third node is directly connected to the fourth node.

7. The pixel circuit of claim 6, wherein each of the first switch element to the fifth switch element is configured to be turned on when a voltage applied to its gate electrode is a gate-on voltage and turned off when the voltage applied to its gate electrode is a gate-off voltage;

wherein the pixel driving voltage is greater than a maximum voltage of the data voltage;

wherein the initialization voltage is set within a voltage range between the maximum voltage and a minimum voltage of the data voltage;

wherein the cathode voltage is less than the minimum voltage of the data voltage;

wherein the reference voltage is less than the minimum voltage of the data voltage and greater than the cathode voltage;

wherein the gate-on voltage is greater than the pixel driving voltage; and wherein the gate-off voltage is a voltage less than the cathode voltage;

wherein, in the first step, the voltage of the first gate signal is the gate-on voltage, and voltages of the second gate signal to the fifth gate signal are the gate-off voltage;

wherein in the second step, voltages of the second gate signal, the third gate signal, and the fifth gate signal are the gate-on voltage, and voltages of the first gate signal and the fourth gate signal are the gate-off voltage;

wherein in the third step, voltages of the second gate signal and the fifth gate signal are the gate-on voltage, and voltages of the first gate signal, the third gate signal, and the fourth gate signal are the gate-off voltage;

wherein in the fourth step, voltages of the fourth gate signal and the fifth gate signal are the gate-on voltage, and voltages of the first gate signal, the second gate signal, and the third gate signal are the gate-off voltage;

wherein in the fifth step, the voltage of the fifth gate signal is the gate-on voltage, the voltages of the first gate signal, the second gate signal, and the fourth gate signal are the gate-off voltage, and the voltage of the third gate signal is the gate-on voltage or the gate-off voltage; and wherein in the sixth step, the voltage of the fifth gate signal is the gate-on voltage, and the voltage of the first gate signal to the fourth gate signal are the gate-off voltage.

8. The pixel circuit of claim 7, wherein a cathode electrode of the light emitting element is connected to a second constant voltage node to which the cathode voltage is applied;

wherein the first switch element includes a first electrode connected to a data line to which the data voltage is applied, a gate electrode connected to a fourth gate line to which the fourth gate signal is applied, and a second electrode connected to the second node;

wherein the second switch element includes a first electrode connected to a third constant voltage node to which the initialization voltage is applied, a gate electrode connected to a second gate line to which the second gate signal is applied, and a second electrode connected to the second node;

wherein the third switch element includes a first electrode connected to the third node, a gate electrode connected to a third gate line to which the third gate signal is applied, and a second electrode connected to a fourth constant voltage node to which the reference voltage is applied;

wherein the fourth switch element includes a gate electrode connected to a first gate line to which the first gate signal is applied, a first electrode connected to the third node, and a second electrode connected to the second constant voltage node or the fourth constant voltage node; and wherein the fifth switch element includes a gate electrode connected to a fifth gate line to which the fifth gate signal is applied, a first electrode connected to a first constant voltage node to which the pixel driving voltage is applied, and a second electrode connected to the first node.

9. The pixel circuit of claim 2, wherein the third switch element is configured to apply the reference voltage to the third node or the fourth node in response to a second pulse of the third gate signal in the fifth step.

10. The pixel circuit of claim 9, wherein a second pulse of the third gate signal is generated in the fifth step in a low-speed driving mode with a constant frequency that is a same as that in a high-speed driving mode.

11. The pixel circuit of claim 2, further comprising:

a sixth switch element connected between the third node and the fourth node, wherein the sixth switch element is configured to be turned on in response to a pulse of a sixth gate signal in the first step, the second step, the fifth step, and the sixth step to connect the third node to the fourth node.

12. The pixel circuit of claim 11, wherein each of the first switch element to the sixth switch element is configured to be turned on responsive to a voltage being applied to its gate electrode is a gate-on voltage and turned off responsive to the voltage being applied to its gate electrodes is a gate-off voltage;

wherein the pixel driving voltage is greater than a maximum voltage of the data voltage;

wherein the initialization voltage is set within a voltage range between the maximum voltage and a minimum voltage of the data voltage;

wherein the cathode voltage is less than the minimum voltage of the data voltage;

wherein the reference voltage is less than the minimum voltage of the data voltage and greater than the cathode voltage;

wherein the gate-on voltage is greater than the pixel driving voltage; and wherein the gate-off voltage is a voltage that is less than the cathode voltage.

13. The pixel circuit of claim 12, wherein a voltage of the first gate signal is the gate-off voltage in a first step of a first frame period when an input image starts to be displayed, and the voltage of the first gate signal is the gate-on voltage in a first step of every frame period subsequent to the first frame period.

14. The pixel circuit of claim 12, wherein, in the first step, voltages of the first gate signal and the sixth gate signal are the gate-on voltage, and the voltages of the second gate signal to the fifth gate signal are the gate-off voltage;

wherein in the second step, the voltages of the second gate signal, the third gate signal, and the sixth gate signal are the gate-on voltage, and the voltages of the first gate signal, the fourth gate signal, and the fifth gate signal are the gate-off voltage;

wherein in the third step, the voltages of the second gate signal and the fifth gate signal are the gate-on voltage, the voltages of the first gate signal, the fourth gate signal, and the sixth gate signal are the gate-off voltage, and at the beginning of the third step, the voltage of the third gate signal is generated as the gate-on voltage and then inverted to the gate-off voltage in a rest period of the third step;

wherein in the fourth step, the voltage of the fourth gate signal and the fifth gate signal are the gate-on voltage, and the voltages of the first gate signal, the second gate signal, the third gate signal, and the sixth gate signal are the gate-off voltage;

wherein in the fifth step, the voltage of the sixth gate signal is the gate-on voltage, the voltages of the first gate signal, the second gate signal, the fourth gate signal, and the fifth gate signal are the gate-off voltage, and the voltage of the third gate signal is the gate-on voltage or the gate-off voltage;

wherein in the sixth step, the voltages of the fifth gate signal and the sixth gate signal are the gate-on voltage, and the voltages of the first gate signal to the fourth gate signal are the gate-off voltage.

15. The pixel circuit of claim 14, wherein in the sixth step, the pulse of the fifth gate signal is generated as a pulse width modulation (PWM) pulse of the gate-on voltage having a variable duty ratio.

16. The pixel circuit of claim 15, wherein in the sixth step, the third gate signal is synchronized with the fifth gate signal.

17. The pixel circuit of claim 14, wherein responsive to the pixel circuit being driven in a low-speed driving mode, the voltage of the third gate signal is the gate-on voltage in the fifth step.

18. The pixel circuit of claim 14, wherein a cathode electrode of the light emitting element is connected to a second constant voltage node to which the cathode voltage is applied;

wherein the first switch element includes a first electrode connected to a data line to which the data voltage is applied, a gate electrode connected to a fourth gate line to which the fourth gate signal is applied, and a second electrode connected to the second node;

wherein the second switch element includes a first electrode connected to a third constant voltage node to which the initialization voltage is applied, a gate electrode connected to a second gate line to which the second gate signal is applied, and a second electrode connected to the second node;

wherein the third switch element includes a first electrode connected to the third node or the fourth node, a gate electrode connected to a third gate line to which the third gate signal is applied, and a second electrode connected to a fourth constant voltage node to which the reference voltage is applied;

wherein the fourth switch element includes a gate electrode connected to a first gate line to which the first gate signal is applied, a first electrode connected to the third node or the fourth node, and a second electrode connected to the second constant voltage node or the fourth constant voltage node;

wherein the fifth switch element includes a gate electrode connected to a fifth gate line to which the fifth gate signal is applied, a first electrode connected to a first constant voltage node, and a second electrode connected to the first node; and wherein the sixth switch element includes a gate electrode connected to a sixth gate line to which the sixth gate signal is applied, a first electrode connected to the third node, and a second electrode connected to the fourth node.

19. The pixel circuit of claim 14, wherein a cathode electrode of the light emitting element is connected to a second constant voltage node to which the cathode voltage is applied;

wherein the first switch element includes a first electrode connected to a data line to which the data voltage is applied, a first gate electrode connected to a fourth gate line to which the fourth gate signal is applied, a second gate electrode connected to the first gate electrode, and a second electrode connected to the second node;

wherein the second switch element includes a first electrode connected to a third constant voltage node to which the initialization voltage is applied, a first gate electrode connected to a second gate line to which the second gate signal is applied, a second gate electrode connected to the first gate electrode of the second switch element, and a second electrode connected to the second node;

wherein the third switch element includes a first electrode connected to the third node or the fourth node, a first gate electrode connected to a third gate line to which the third gate signal is applied, a second gate electrode connected to the first gate electrode of the third switch element, and a second electrode connected to a fourth constant voltage node to which the reference voltage is applied;

wherein the fourth switch element includes a gate electrode connected to a first gate line to which the first gate signal is applied, a first electrode connected to the fourth node, and a second electrode connected to the second constant voltage node or the fourth constant voltage node;

wherein the fifth switch element includes a first gate electrode connected to a fifth gate line to which the fifth gate signal is applied, a first electrode connected to a first constant voltage node, a second electrode connected to the first node, and a second gate electrode connected to the first node; and wherein the sixth switch element includes a first gate electrode connected to a sixth gate line to which the sixth gate signal is applied, a first electrode connected to the third node, a second electrode connected to the fourth node, and a second gate electrode connected to the fourth node.

20. A display device for displaying pixel data of an input image comprising:

a display panel including a plurality of pixel circuits;

a data driver configured to output a data voltage of pixel data; and a gate driver configured to sequentially supply a gate signal to the plurality of pixel circuits, wherein each of the plurality of pixel circuits includes:

a driving element including a first electrode connected to a first node, a gate electrode connected to a second node, and a second electrode connected to a third node;

a light emitting element including an anode electrode connected to a fourth node, the light emitting element configured to be driven according to a current from the driving element;

a first switch element configured to supply a data voltage to the second node;

a second switch element configured to supply an initialization voltage to the first node;

a third switch element configured to supply a reference voltage to the third node or the fourth node; and a fourth switch element configured to supply a cathode voltage or the reference voltage to the third node or the fourth node, wherein the fourth switch element is configured to be turned on in response to a pulse of a first gate signal in a first step to apply the cathode voltage or the reference voltage to the third node or the fourth node, wherein the second switch element is configured to be turned on in response to a pulse of a second gate signal after the first step to apply the initialization voltage to the second node, and wherein the third switch element is configured to be turned on in response to a first pulse of a third gate signal occurring after the first step to apply the reference voltage to the third node or the fourth node, wherein a waveform of the third gate signal is different from a waveform of the second gate signal, and each of the initialization voltage, the reference voltage, and the cathode voltage is a constant voltage.

* * * * *